US011016536B2

(12) United States Patent
Lee et al.

(10) Patent No.: US 11,016,536 B2
(45) Date of Patent: May 25, 2021

(54) DISPLAY APPARATUS

(71) Applicant: SAMSUNG ELECTRONICS CO., LTD., Suwon-si (KR)

(72) Inventors: Jae Neung Lee, Suwon-si (KR); Byung Min Woo, Suwon-si (KR); Chui Yong Cho, Suwon-si (KR); Do Sung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/695,552

(22) Filed: Nov. 26, 2019

(65) Prior Publication Data

US 2020/0166966 A1 May 28, 2020

(30) Foreign Application Priority Data

Nov. 28, 2018 (KR) .................. 10-2018-0149931

(51) Int. Cl.
*G06F 1/16* (2006.01)
*G02F 1/1345* (2006.01)
*H05K 5/02* (2006.01)
*G02F 1/1333* (2006.01)

(52) U.S. Cl.
CPC ........ *G06F 1/1637* (2013.01); *G02F 1/13452* (2013.01); *H05K 5/02* (2013.01); *G02F 1/133314* (2021.01)

(58) Field of Classification Search
CPC ...... G06F 1/1637; G02F 1/13452; H05K 5/02
USPC ................ 345/1.3; 1/1; 455/575.3
See application file for complete search history.

(56) References Cited

U.S. PATENT DOCUMENTS

| 3,538,323 | A  | * | 11/1970 | Ziegler ..................... F21V 3/00 362/293 |
| 5,606,816 | A  | * | 3/1997  | Schwartz ................. G09F 7/22 40/605 |
| 2010/0016038 | A1 | * | 1/2010  | Demuynck ......... H04M 1/0237 455/575.3 |
| 2013/0219760 | A1 | * | 8/2013  | Acker ................ G09F 15/0062 40/610 |
| 2016/0344135 | A1 | * | 11/2016 | Bonner ................ A47F 5/0018 |
| 2017/0084208 | A1 | * | 3/2017  | Durant ...................... G09F 7/18 |
| 2019/0294207 | A1 | * | 9/2019  | Durant ................. G06F 1/1624 |

FOREIGN PATENT DOCUMENTS

| CN | 203982709   | * | 12/2014 | ............... G09F 9/33 |
| CN | 203982709 U | * | 12/2014 | ............... G09F 9/33 |
| EP | 2660710     |   | 11/2013 | |

(Continued)

OTHER PUBLICATIONS

Extended Search Report dated Mar. 20, 2020 from European Patent Application No. 19212081.4, 10 pages.

*Primary Examiner* — Prabodh M Dharia
(74) *Attorney, Agent, or Firm* — Staas & Halsey LLP

(57) ABSTRACT

A display apparatus includes at least one display assembly. The display apparatus includes a first display assembly and a second display assembly adjacent to the first display assembly. Each of the first and second display assemblies includes a display module forming a screen, a display module support provided to support the display module and having a slit, and a coupler configured to couple the first display assembly and the second display assembly to each other.

11 Claims, 36 Drawing Sheets

(56) References Cited

FOREIGN PATENT DOCUMENTS

| KR | 10-1705510 | 2/2017 |
|----|------------|--------|
| WO | 2017/123528 | 7/2017 |
| WO | 2018/099581 | 6/2018 |

\* cited by examiner

DISPLAY APPARATUS

CROSS-REFERENCE TO RELATED APPLICATION(S)

This application is based on and claims priority under 35 U.S.C. § 119 to Korean Patent Application No. 10-2018-0149931, filed on Nov. 28, 2018 in the Korean Intellectual Property Office, the disclosure of which is incorporated by reference herein in its entirety.

BACKGROUND

1. Technical Field

The present disclosure relates to a display apparatus, and more particularly to a display apparatus including at least one display assembly.

2. Description of the Related Art

A display apparatus is a type of an output apparatus that visually displays data information such as characters and graphics, images and the like.

In recent years, there has been growing interest in a display apparatus including a plurality of display assemblies. Such a display apparatus may realize a screen with a large area by arranging the plurality of display assemblies successively. The plurality of display assemblies each may display a different image or a part of a whole image.

In general, a user has to couple the plurality of display assemblies by using a separate fastening tool, and the method of coupling the display assemblies is not simple, thus it is difficult to couple the plurality of display assemblies. In addition, the user needs to endure the inconvenience of connecting a cable for power supply and a cable for signal transmission to each of the plurality of display assemblies in the process of coupling the plurality of display assemblies.

SUMMARY

In accordance with an aspect of the present disclosure, a display apparatus may include a first display assembly and a second display assembly adjacent to the first display assembly.

Each of the first and second display assemblies may include a display module forming a screen, a display module supporter provided to support the display module and having a slit, and a coupling unit provided inside the display module supporter to couple the first display assembly and the second display assembly to each other, and the first display assembly and the second display assembly may be coupled to each other and at the same time electrically connected when the coupling unit of any one of the first display assembly and the second display assembly is coupled to the slit of the other of the first display assembly and the second display assembly.

The display module may be detachably coupled to the display module supporter.

Each of the first and second display assemblies may further include an operation unit rotatably coupled to the coupling unit to operate the coupling unit.

The display module supporter may include a front frame facing the display module, and the operation unit may be provided to be exposed to the outside of the front frame.

The display module supporter may include a front frame facing the display module, a rear frame facing the front frame and on which the coupling unit is mounted, and a side frame to connect the front frame and the rear frame, and the slit may be formed to correspond to the coupling unit provided inside the display module supporter.

The coupling unit may be provided to be capable of protruding to the outside of the slit formed on the side frame and may include a fastening member having a first power terminal.

A second power terminal may be mounted on an inner wall of the side frame to contact the first power terminal so that power is transmitted between the first display assembly and the second display assembly.

Each of the first and second display assemblies may further include an image signal control board disposed inside any one of the display module and the display module supporter, and a wireless communication module disposed inside any one of the display module and the display module supporter with the image signal control board to transmit and receive signals between the first display assembly and the second display assembly.

Each of the first and second display assemblies may further include a power control board disposed inside the display module supporter, the display module supporter may further include a first connector coupled to the power control board, and the display module may include at least one LED panel, a support frame to support the at least one LED panel, and a second connector coupled to the first connector to transmit and receive signals or power between the display module and the display module supporter.

The coupling unit may include a rotation member coupled to the operation unit to rotate integrally with the operation unit, a fastening member provided to be capable of protruding to the outside of the slit according to an operation of the operation unit, and a link member to connect the rotation member and the fastening member.

The display module supporter may further include a rear cover coupled to the rear frame to form a rear surface appearance of the display module supporter and having a cut portion, and a cap detachably disposed in the cut portion to cover a mounting groove formed to be recessed on one surface of the front frame.

In accordance with an aspect of the present disclosure, a display apparatus may include at least one display assembly.

The at least one display assembly may include a display module forming a screen, a display module supporter provided at the rear of the display module to support the display module and including a plurality of slits formed on an outer side surface of the display module supporter to direct to the up-down direction and the left-right direction of the display module supporter, and a plurality of coupling units provided inside the display module supporter to correspond to the plurality of slits and including a fastening member provided to protrude to the outside of the display module supporter through each of the plurality of slits.

The display module supporter may include a front frame facing the display module, a rear frame facing the front frame and on which the plurality of coupling units are mounted, and a side frame to connect the front frame and the rear frame, and the plurality of slits may be formed to be spaced apart from each other along a circumference of the side frame.

The at least one display assembly may include a first display assembly and a second display assembly adjacent to each other, and any one fastening member of the plurality of coupling units of any one of the first display assembly and the second display assembly may be coupled to any one of the plurality of slits of the other of the first display assembly and the second display assembly.

The first display assembly and the second display assembly may be electrically connected by coupling any one fastening member of the plurality of coupling units of any one of the first display assembly and the second display assembly to any one of the plurality of slits of the other of the first display assembly and the second display assembly.

A power source may be connected to any one of the first display assembly and the second display assembly.

The fastening member may include a first power terminal, and a second power terminal may be mounted on an inner wall of the side frame to contact the first power terminal so that the power supplied from the power source is transmitted between the first display assembly and the second display assembly.

The at least one display assembly may further include a power control board disposed inside any one of the display module and the display module supporter, an image signal board disposed inside the other of the display module and the display module supporter, and a wireless communication module disposed inside the other of the display module and the display module supporter with the image signal control board.

The at least one display assembly may further include a plurality of operation units rotatably coupled to each of the plurality of coupling units to operate each of the plurality of coupling units.

In accordance with an aspect of the present disclosure, a display apparatus may include at least one display assembly, and an accessory adjacent to the at least one display assembly and including a slit, wherein the at least one display assembly may include a display module forming a screen, a display module supporter provided to support the display module, and a coupling unit provided inside the display module supporter to couple the at least one display assembly and the accessory to each other, and the at least one display assembly and the accessory may be coupled to each other and at the same time electrically connected when the coupling unit of the at least one display assembly is coupled to the slit of the accessory.

Additional aspects of the present disclosure will be set forth in part in the description which follows and, in part, will be obvious from the description, or may be learned by practice of the present disclosure.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Hereinafter, preferred embodiments of the present disclosure will be described in detail with reference to the accompanying drawings. The terms "front end", "rear end", "upper portion", "lower portion", "upper end" and "lower end" used in the following description are defined with reference to the drawings, and the shape and position of each component are not limited by these terms.

Hereinafter, "X" indicates the front-rear direction of a display assembly, "Y" indicates the left-right direction of the display assembly, and "Z" indicates the up-down direction of the display assembly. For reference, the thickness direction of the display assembly may indicate the same direction as the front-rear direction of the display assembly.

Figure 1:
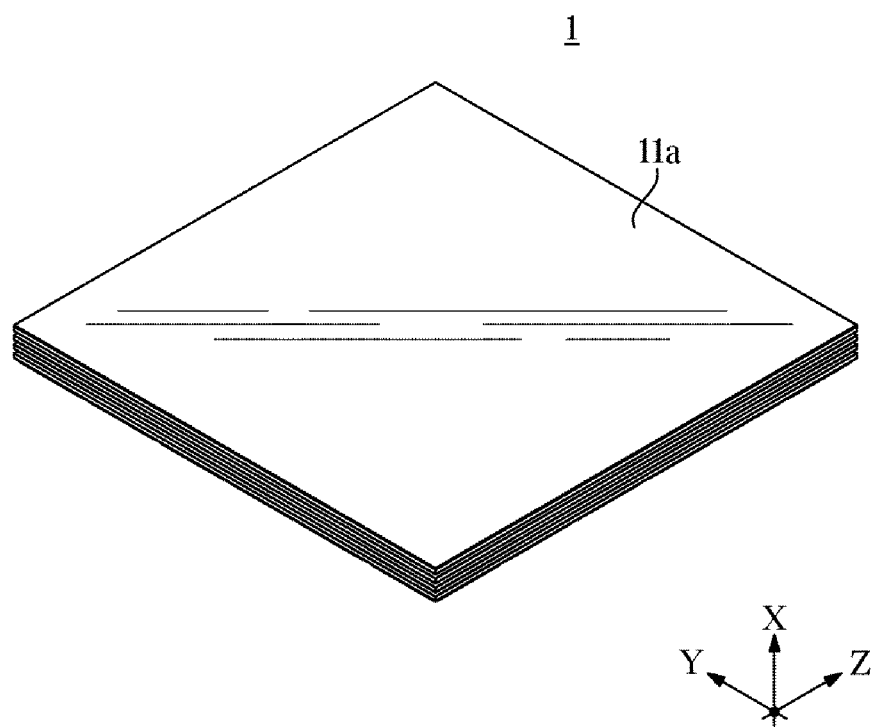
FIG. 1 is a perspective view of a display assembly according to an embodiment of the present disclosure.
Figure 2:
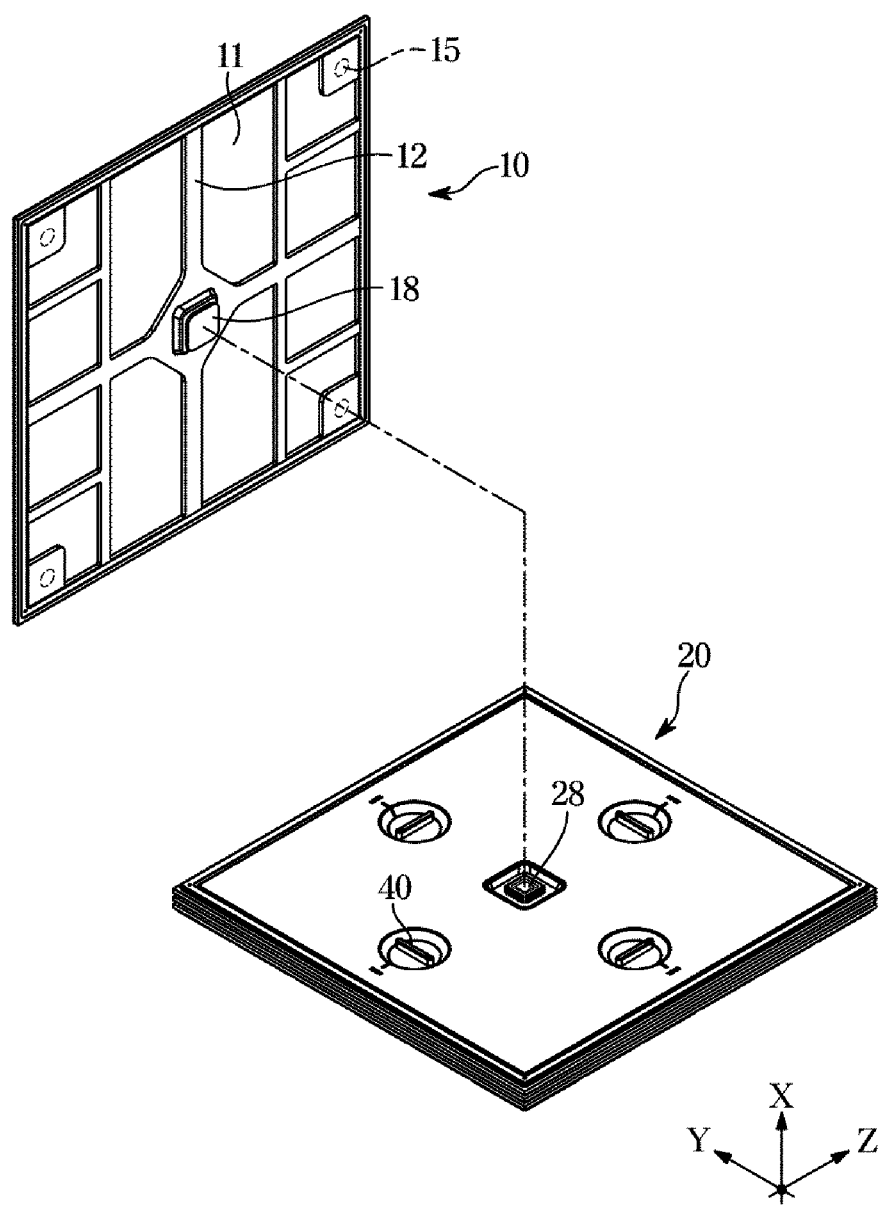
FIG. 2 is an exploded perspective view of a display assembly according to an embodiment of the present disclosure.

FIG. 1 is a perspective view of a display assembly according to an embodiment of the present disclosure, and FIG. 2 is an exploded perspective view of a display assembly according to an embodiment of the present disclosure.

As illustrated in FIGS. 1 and 2, a display assembly 1 may include a display module 10 forming a screen 11a and a display module support 20 (also referred to as display module supporter 20) configured to support the display module 10.

The display module 10 and the display module supporter 20 may be detachably coupled to each other. As an example, the display module 10 and the display module supporter 20 may be detachably coupled to each other by a magnetic force.

The display module 10 and the display module supporter 20 may be electrically connected. The display module 10 and the display module supporter 20 may exchange signals with each other by being electrically connected to each other. As an example, the display module 10 and the display module supporter 20 may exchange image signals with each other. The display module 10 and the display module supporter 20 may be electrically connected to each other by the coupling of a first connector 18 of the display module 10 and a second connector 28 of the display module supporter 20.

The display module 10 may include at least one LED panel 11 forming the screen 11a and a support frame 12 provided to support the at least one LED panel 11. The at least one LED panel 11 may be coupled to the support frame 12. As an example, the at least one LED panel 11 may be coupled to the support frame 12 by an adhesive member (not shown). The adhesive member may comprise a double-sided tape. However, the type of the adhesive member is not limited to the above example and may be variously changed.

The display module 10 may further include a first magnet 15 that is involved in the coupling of the display module 10 and the display module supporter 20. The first magnet 15 may be disposed on one surface of the support frame 12 facing the at least one LED panel 11. Preferably, the display module 10 may include a plurality of the first magnets 15, and each of the plurality of first magnets 15 may be mounted at a corner of one surface of the support frame 12 facing the at least one LED panel 11. However, the position of the first magnets 15 is not limited to the above-described example, and may be variously changed.

The display module 10 may further include the first connector 18 that is involved in electrical connection between the display module 10 and the display module supporter 20. The first connector 18 may be mounted on the support frame 12. Preferably, the first connector 18 may be mounted at a central portion of the support frame 12 so as to be coupled to the second connector 28 of the display module supporter 20.

The display assembly 1 may further include a coupler 30 (also referred to as coupling unit 30) (refer to FIG. 3) configured to couple the adjacent display assemblies 1 or the plurality of display assemblies 1 and an accessory. As an example, the accessory may include a shelf, a speaker, a table, and the like. A detailed description of the coupling unit 30 will be given later.

The display assembly 1 may further include an actuator 40 (also referred to as operation unit 40) coupled to the coupling unit 30 and configured to operate the coupling unit 30. Specifically, the operation unit 40 may be rotatably coupled to the coupling unit 30. The operation unit 40 may be provided on the display module supporter 20 so as to be exposed to the outside of the display module supporter 20. As an example, the operation unit 40 may have a knob shape. However, the shape of the operation unit 40 is not limited to the above example and may be variously changed.

Figure 3:
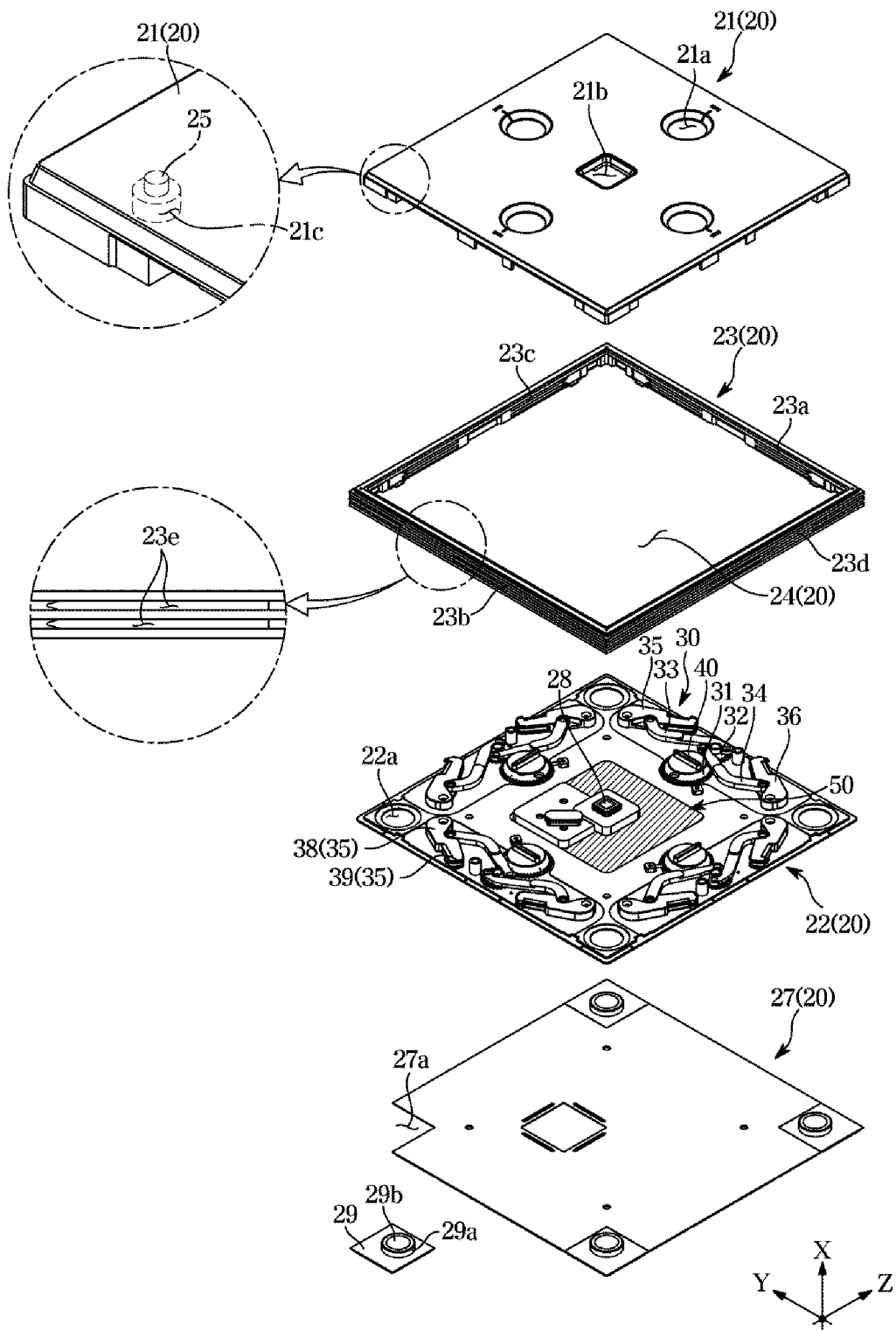
FIG. 3 is an exploded perspective view of a display module support of a display assembly according to an embodiment of the present disclosure.
Figure 4:
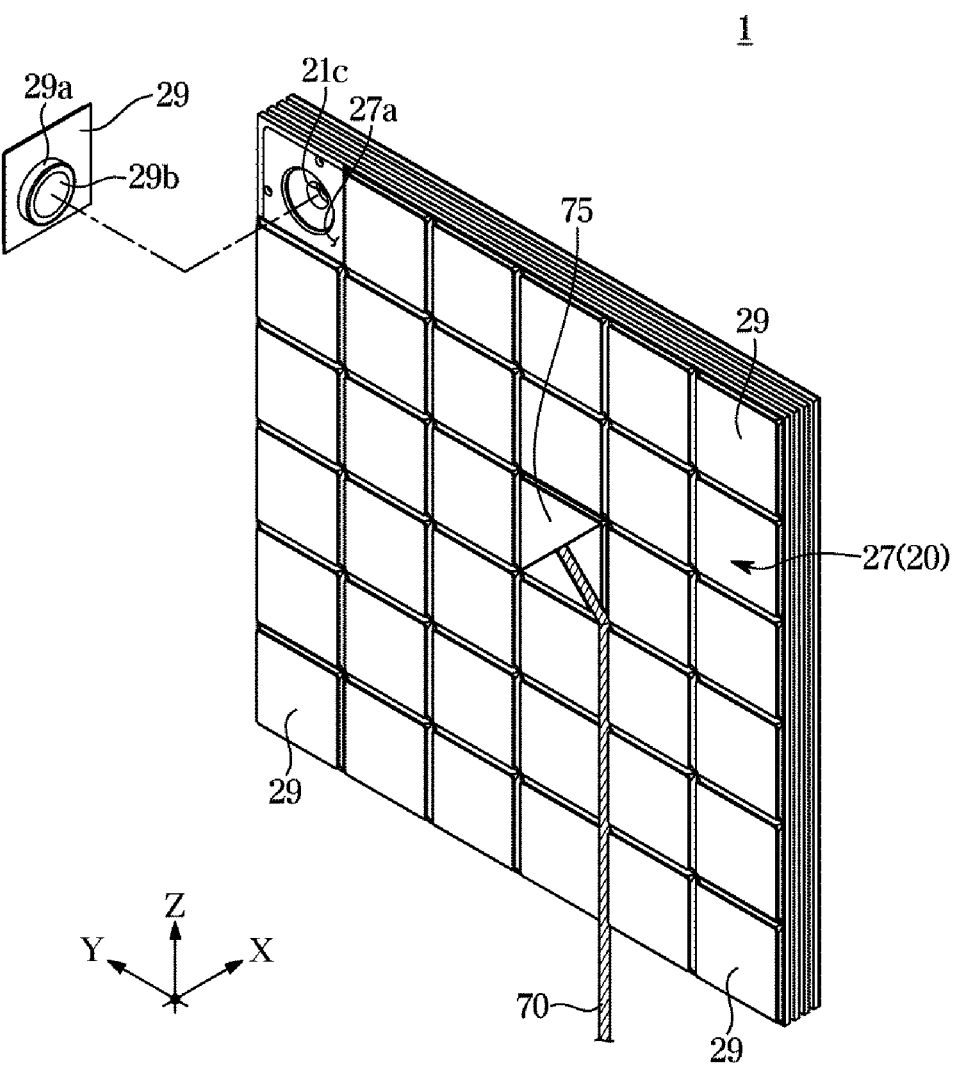
FIG. 4 is a rear perspective view of a display assembly according to an embodiment of the present disclosure.

FIG. 3 is an exploded perspective view of a display module supporter of a display assembly according to an embodiment of the present disclosure, and FIG. 4 is a rear perspective view of a display assembly according to an embodiment of the present disclosure.

As illustrated in FIGS. 3 and 4, the display module supporter 20 may include a front frame 21 facing the display module 10, a rear frame 22 facing the front frame 21, and a side frame 23 connecting the front frame 21 and the rear frame 22. The display module supporter 20 may further include a supporter internal space 24 defined by the front frame 21, the rear frame 22, and the side frame 23.

The front frame 21 may form a front surface appearance of the display module supporter 20. The front frame 21 may be provided with an operation unit coupling hole 21a through and to which the operation unit 40 passes and is coupled so that the operation unit 40 is exposed to the outside of the display module supporter 20. The front frame 21 may also be provided with a connector coupling hole 21b through and to which the second connector 28 passes and is coupled so that the second connector 28 is exposed to the outside of the display module supporter 20. The second connector 28 coupled to the connector coupling hole 21b of the front frame 21 so as to pass through the connector coupling hole 21b may be coupled to the first connector 18 of the display module 10. The connector coupling hole 21b may be formed at a central portion of the front frame 21. In another aspect, the connector coupling hole 21b may be formed on the front frame 21 so as to be positioned inside the operation unit coupling hole 21a. That is, the connector coupling hole 21b may be surrounded by a plurality of the operation unit coupling holes 21a.

The front frame 21 may be provided with a mounting groove 21c. The mounting groove 21c may be formed to be recessed on one surface of the front frame 21 facing the supporter internal space 24 so as to be openable and closable by a cap 29. The mounting groove 21c may be used to hang the display assembly 1 on a mounting surface such as a wall.

The side frame 23 may form an outer surface appearance of the display module supporter 20. The side frame 23 may have a substantially picture frame shape. The side frame 23 may include an upper edge 23a, a lower edge 23b facing the upper edge 23a, and a left edge 23c and a right edge 23d connecting the upper edge 23a and the lower edge 23b and facing each other.

A slit 23e may be formed on the side frame 23. The slit 23e may be formed on the side frame 23 so as to correspond to the coupling unit 30 provided inside the display module supporter 20. Specifically, the slit 23e may be formed on the upper edge 23a, the lower edge 23b, the right edge 23d and the left edge 23c of the side frame 23. More specifically, a pair of the slits 23e adjacent to each other in the front-rear direction may be formed on the upper edge 23a, the lower edge 23b, the right edge 23d and the left edge 23c of the side frame 23. The slits 23e are not only involved in the coupling of the adjacent display assemblies 1 or the display assembly 1 and the accessory but may also serve as a passage through which the heat generated in the internal space of the display module supporter 20, that is, in the supporter internal space 24 radiates to the outside of the display module supporter 20.

A first power terminal 26 (refer to FIG. 6A) may be mounted on the side frame 23. The first power terminal 26 may be mounted on an inner wall of the side frame 23. The first power terminal 26 may be disposed to be adjacent to the slit 23e. The first power terminal 26 may be involved in power transmission between the adjacent display assemblies 1 or the plurality of display assemblies 1 and the accessory together with a second power terminal 39a of the coupling unit 30.

The side frame 23 may have a serration shape in which a portion protruding outward of the display module supporter 20 and a portion recessed inward of the display module supporter 20 in a thickness direction X of the display module supporter 20 are alternately arranged. However, the shape of the side frame 23 is not limited to the above example and may be variously changed.

The coupling unit 30 may be installed on the rear frame 22. Specifically, the coupling unit 30 may be installed on the rear frame 22 so as to be positioned in the supporter internal space 24. Preferably, the display assembly 1 may include a plurality of the coupling units 30. Each of the plurality of coupling units 30 may be provided at an edge portion of the rear frame 22 so as to be adjacent to the upper edge 23a, the lower edge 23b, the left edge 23c and the right edge 23d of the side frame 23. As such, the plurality of coupling units 30 are provided so as to correspond to the respective edges 23a, 23b, 23c and 23d of the side frame 23, so that the plurality of adjacent display assemblies 1 may freely be coupled to each other in the up-down direction or the left-right direction.

The rear frame 22 may be provided with a cap coupling hole 22a to which the cap 29 is coupled. Preferably, the cap coupling hole 22a may be formed at a corner of the rear frame 22. The cap 29 may be detachably coupled to the cap coupling hole 22a of the rear frame 22.

The display module supporter 20 may further include a rear cover 27 coupled to the rear frame 22 so as to form a rear surface appearance of the display module supporter 20. The rear cover 27 may include a cut portion 27a. Preferably, the rear cover 27 may include a plurality of the cut portions 27a, and each of the plurality of cut portions 27a may be formed at a corner of the rear cover 27.

The display module supporter 20 may further include the cap 29 forming a rear surface appearance of the display module supporter 20 together with the rear cover 27. The cap 29 may be disposed in the cut portion 27a of the rear cover 27 so as to cover the mounting groove 21c of the front frame 21. The cap 29 may be detachably disposed in the cut portion 27a of the rear cover 27. When the cap 29 is detached from the cut 27a of the rear cover 27, the mounting groove 21c of the front frame 21 may be exposed. As an example, when a user wishes to install the display assembly 1 on a mounting surface such as a wall, the user may fix a fixing member such as a screw to the mounting surface and then hang the mounting groove 21c of the display assembly 1 on the fixing member by detaching the cap 29 from the display assembly 1. The display assembly 1 may be easily installed on the mounting surface without deteriorating the appearance of the display assembly 1 through the configuration such as the mounting groove 21c and the cap 29. The cap 29 may be formed of an elastic material. As an example, the cap 29 may be formed of rubber, silicon, or the like. The cap 29 may be detachably coupled to the front frame 21 by a magnetic force to cover the mounting groove 21c. The cap 29 may include a magnet mounting portion 29a on which a magnet 29b is mounted. The cap 29 may be detachably coupled to the front frame 21 by the interaction of the magnet 29b mounted on the magnet mounting portion 29a and a second magnet 25 provided on the front frame 21.

The display module supporter 20 may further include the second magnet which is involved in the coupling of the display module 10 and the display module supporter 20 together with the first magnet 15. The second magnet 25 may be provided on the front frame 21. The display module 10 and the display module supporter 20 may be detachably coupled to each other by the interaction of the first magnet 15 and the second magnet 25. The second magnet 25 is not only involved in the coupling of the display module 10 and the display module supporter 20 but may also be involved in the coupling of the cap 29 and the front frame 21 together with the magnet 29b.

The display assembly 1 may further include a control board 50 disposed inside any one of the display module 10 and the display module supporter 20. Preferably, the control board 50 may be disposed in the internal space of the display module supporter 20, that is, the supporter internal space 24. The control board 50 may be mounted on the rear frame 22. The control board 50 may be installed at a central portion of the rear frame 22 so as to be surrounded by the plurality of coupling units 30. The control board 50 may control the power supply and signal transmission/reception. The second connector 28 may be mounted on the control board 50 such that the second connector 28 is coupled to the connector coupling hole 21b of the front frame 21 and exposed to the outside of the display module supporter 20. When power is supplied to the control board 50 by a power source (not shown), the control board 50 may transmit a signal to the display module 10 through the coupling of the first connector 18 and the second connector 28. The first power terminal 26 provided on the side frame 23 and the second power terminal 39a provided on fasteners 35 and 36 (also referred to as fastening members 35 and 36) of the coupling unit 30 may be electrically connected to the control board 50 by a cable 80 (refer to FIG. 6A).

The display assembly 1 may further include a wireless communication module 60 (refer to FIG. 6A) disposed inside any one of the display module 10 and the display module supporter 20 together with the control board 50 so that the plurality of adjacent display assemblies 1 transmit and receive signals to each other. Preferably, the wireless communication module 60 may be disposed in the internal space of the display module supporter 20, that is, the supporter internal space 24. The wireless communication module 60 may include a short-range wireless communication module. Signals that may be transmitted and received through the wireless communication module 60 may include an image signal. The wireless communication module 60 may be mounted on the inner wall of the side frame 23. Preferably, the display assembly 1 may include a plurality of the wireless communication modules 60, and the respective wireless communication modules 60 may be mounted on the upper edge 23a, the lower edge 23b, the left edge 23c and the right edge 23d of the side frame 23.

The display assembly 1 may further include the coupling unit 30. Preferably, the display assembly 1 may further include a plurality of the coupling units 30.

Each of the plurality of coupling units 30 may include a first rotation member 31 coupled to the operation unit 40 to rotate integrally with the operation unit 40, a second rotation member 32 provided to be engaged and rotated with the first rotation member 31, the fastening members 35 and 36 provided so as to be capable of protruding outside the slit 23e according to an operation of the operation unit 40, and link members 33 and 34 connecting the second rotation member 32 and the fastening members 35 and 36.

The first rotation member 31 may be disposed further inside the display module supporter 20 more than the second rotation member 32. The first rotation member 31 and the second rotation member 32 include toothed portions 31b and 32b (refer to FIG. 6A), respectively, and the number of teeth of the toothed portion 31b of the first rotation member 31 may be greater than the number of teeth of the toothed portion 32b of the second rotation member 32. The first rotation member 31 is rotatable about a first rotation member rotating shaft 31a (refer to FIG. 6A), and the second rotation member 32 is rotatable about a second rotation member rotating shaft 32a (refer to FIG. 6A). The operation unit 40 may be coupled to the first rotation member rotating shaft 31a of the first rotation member 31 and to rotate integrally with the first rotation member 31.

Figure 6A:
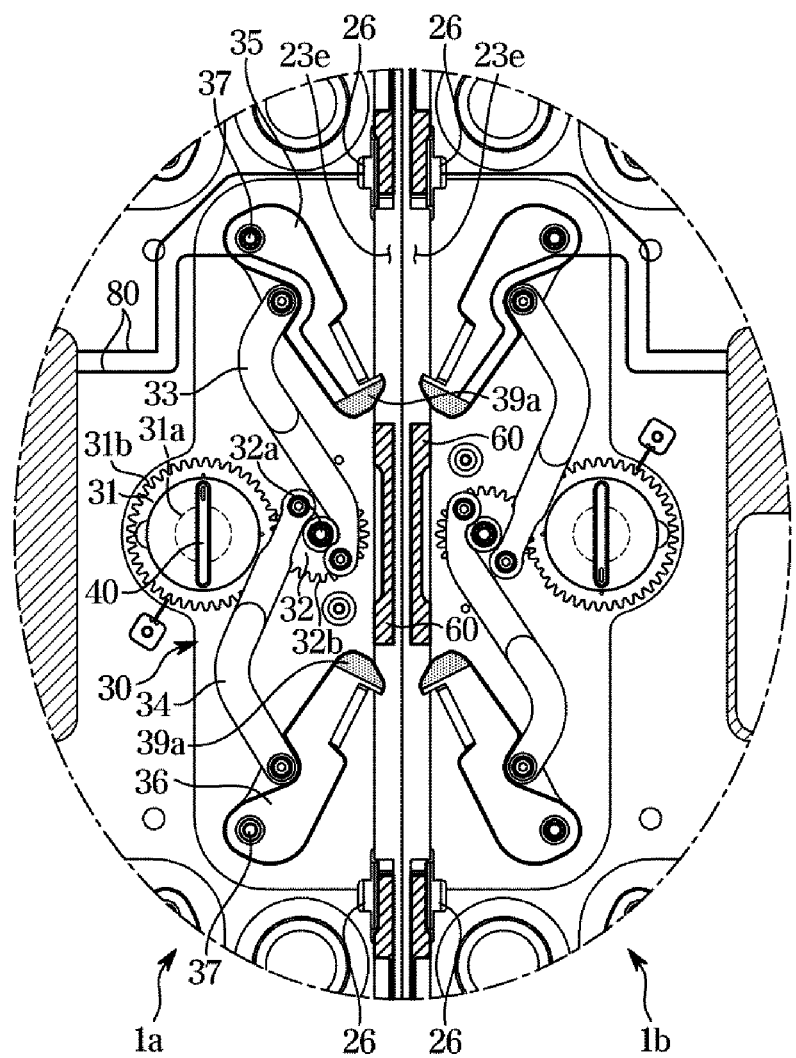
FIGS. 6A and 6B are enlarged views of a portion of FIG. 5 to illustrate a process in which the first display assembly and the second display assembly are coupled to each other.

The fastening members 35 and 36 may be provided so as to be rotatable about a fastening member rotating shaft 37 (refer to FIG. 6A). The fastening members 35 and 36 may include a fastening member body 38 and a plurality of arms 39 extending from the fastening member body 38. The plurality of arms 39 may be spaced apart a predetermined distance in the thickness direction X of the display module supporter 20. The fastening member rotating shaft 37 may be coupled to the fastening member body 38 so as to pass through the fastening member body 38 and fixed to the rear frame 22. The plurality of arms 39 of the fastening members 35 and 36 may each be inserted into the pair of slits 23e formed on the side frame 23 according to an operation of the operation unit 40 to protrude to the outside of the display module supporter 20. The plurality of arms 39 may be provided with the second power terminal 39a (refer to FIG. 6A).

The link members 33 and 34 may connect the second rotation member 32 and the fastening members 35 and 36. Specifically, one end of the link members 33 and 34 may be coupled to the second rotation member 32 and the other end of the link members 33 and 34 may be coupled to the fastening member body 38 of the fastening members 35 and 36. The link members 33 and 34 function to transmit the movement of the second rotation member 32 to the fastening members 35 and 36.

Preferably, each of the plurality of coupling units 30 may include a plurality of the fastening members 35 and 36. Specifically, the plurality of fastening members 35 and 36 may include the first fastening member 35 and the second fastening member 36.

Preferably, each of the plurality of coupling units 30 may include a plurality of the link members 33 and 34. Specifically, the plurality of link members 33 and 34 may include the first link member 33 connecting the second rotation member 32 and the first fastening member 35 and the second link member 34 connecting the second rotation member 32 and the second fastening member 36. One end of the first link member 33 coupled to the second rotation member 32 may be positioned on the opposite side of one end of the second link member 34 coupled to the second rotation member 32 about the second rotation member rotating shaft 32a.

The fastening member rotating shaft 37 may be positioned between the first rotation member rotating shaft 31a and the second rotation member rotating shaft 32a in the left-right direction or the up-down direction of the display module supporter 20. In another aspect, in the first rotation member 31, the second rotation member 32, and the fastening members 35 and 36 constituting the coupling unit 30, the fastening member rotating shaft 37 may be positioned between the first rotation member rotating shaft 31a and the second rotation member rotating shaft 32a in the longitudinal direction of the other edge connected to one edge of the side frame 23 facing the coupling unit 30. As an example, in the case of the first rotation member 31, the second rotation member 32, and the fastening members 35 and 36 constituting the coupling unit 30 that faces the upper edge 23a of the side frame 23, the fastening member rotating shaft 37 may be positioned between the first rotation member rotating shaft 31a and the second rotation member rotating shaft 32a in the longitudinal direction of the left edge 23c or the right edge 23d.

As an example, the wireless communication module 60 may be mounted on the inner wall of the side frame 23 facing the second rotation member 32 so as to be adjacent to the second rotation member 32. In another aspect, the wireless communication module 60 may be mounted on the inner wall of the side frame 23 so as to be positioned between the first fastening member 35 and the second fastening member 36.

The display assembly 1 may further include a power connector (not shown) connected to the power source by a power cable 70 to receive power from the power source. The power connector may be provided on the display module supporter 20 to supply power to the control board 50. The power connector may be electrically connected to the control board 50. The power connector may be covered by a power connector cover 75 which is detachably provided on the rear cover 27.

Figure 5:
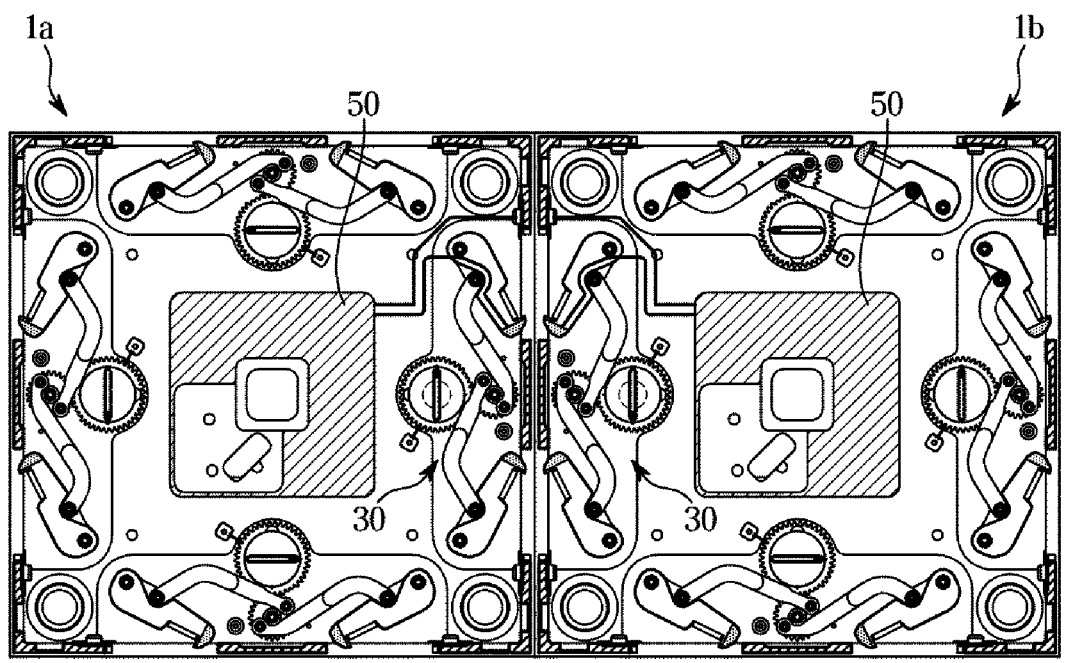
FIG. 5 illustrates a first display assembly and a second display assembly adjacent to each other in a display assembly according to an embodiment of the present disclosure.
Figure 6B:
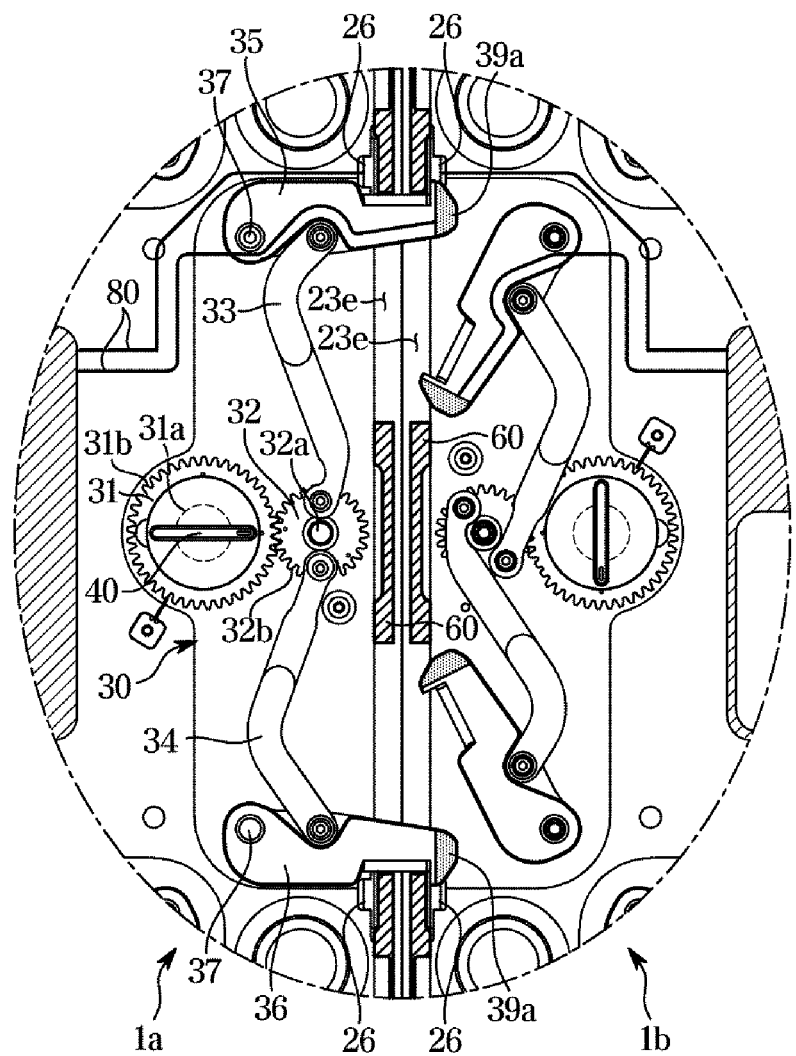

FIG. 5 illustrates a first display assembly and a second display assembly adjacent to each other in a display assembly according to an embodiment of the present disclosure, and FIGS. 6A and 6B are enlarged views of a portion of FIG. 5 to illustrate a process in which the first display assembly and the second display assembly are coupled to each other.

As illustrated in FIGS. 5, 6A and 6B, the display assembly 1 may include a first display assembly 1a and a second display assembly 1b adjacent to the first display assembly 1a.

The first display assembly 1a and the second display assembly 1b may be coupled to each other by the coupling unit 30.

When any one of the coupling units 30 of the first display assembly 1a and the second display assembly 1b is coupled to the other one of the slits 23e of the first display assembly 1a and the second display assembly 1b, the first display assembly 1a and the second display assembly 1b may be coupled to each other and at the same time electrically connected.

As an example, the case where the first display assembly 1a and the second display assembly 1b that are adjacent to each other in the left-right direction are physically coupled and electrically connected to each other as the coupling unit of the first display assembly 1a is coupled to the slit 23e of the second display assembly 1b will be described below.

The display module 10 of the first display assembly 1a and the display module 10 of the second display assembly 1b may be separated from the display module supporter 20 of the first display assembly 1a and the display module supporter 20 of the second display assembly 1b so that the operation unit 40 of the respective display modules 10 is exposed to the outside. Thereafter, when the user rotates the operation unit 40 of the first display assembly 1a in a first direction, the first rotation member 31 of the first display assembly 1a rotates integrally with the operation unit 40. As the first rotation member 31 of the first display assembly 1a rotates, the second rotation member 32 of the first display assembly 1a rotates in a second direction which is the direction opposite to the first direction by being engaged with the first rotation member 31, and a rotational force of the second rotation member 32 of the first display assembly 1a is transmitted to the first fastening member 35 and the second fastening member 36 of the first display assembly 1a through the first link member 33 and the second link member 34 of the first display assembly 1a. The first fastening member 35 and the second fastening member 36 may protrude to the outside of the first display assembly 1a through the slit 23e formed on the right edge 23d of the side frame 23 of the first display assembly 1a by rotating about the fastening member rotating shaft 37. The first fastening member 35 and the second fastening member 36 that protrude to the outside of the first display assembly 1a may be coupled to the second display assembly 1b by being inserted into the slit 23e formed on the left edge 23c of the side frame 23 of the second display assembly 1b. At this time, the second power terminal 39a provided on the first fastening member 35 and the second fastening member 36 of the first display assembly 1a may contact the first power terminal 26 provided on the left edge 23c of the side frame 23 of the second display assembly 1b. When the coupling of the display module supporter 20 of the first display assembly 1a and the display module supporter 20 of the second display assembly 1b is completed, the display module 10 of the first display assembly 1a may be coupled to the display module supporter 20 of the first display assembly 1a, and the display module 10 of the second display assembly 1b may be coupled to the display module supporter 20 of the second display assembly 1b.

The power source may be connected to any one of the first display assembly 1a and the second display assembly 1b. As an example, the case where the power source is connected to the first display assembly 1a by the power cable 70 will be described below.

The power source may be connected to the first display assembly 1a by the power cable 70. When the power source is connected to the first display assembly 1a, the control board 50 of the first display assembly 1a may receive power from the power source. The second power terminal 39a may receive power from the control board 50 because the second power terminal 39a provided on each of the first fastening member 35 and the second fastening member 36 of the first display assembly 1a is electrically connected to the control board 50 by the cable 80. The power supplied to the first display assembly 1a may be transmitted to the second display assembly 1b by the contact between the second power terminal 39a provided on the first fastening member 35 and the second fastening member 36 of the first display assembly 1a and the first power terminal 26 provided on the side frame 23 of the second display assembly 1b.

The first display assembly 1a may also receive a signal such as an image signal from the outside. Particularly, the display module 10 of the first display assembly 1a may output the signal inputted to the control board 50 of the first display assembly 1a by the coupling of the first connector 18 and the second connector 28 of the first display assembly 1a. Also, the signal inputted to the first display assembly 1a may be transmitted to the second display assembly 1b through the transmission and reception between the wireless communication modules 60 of the first display assembly 1a and the second display assembly 1b. The display module 10 of the second display assembly 1b may output the signal received from the first display assembly 1a.

Figure 7:
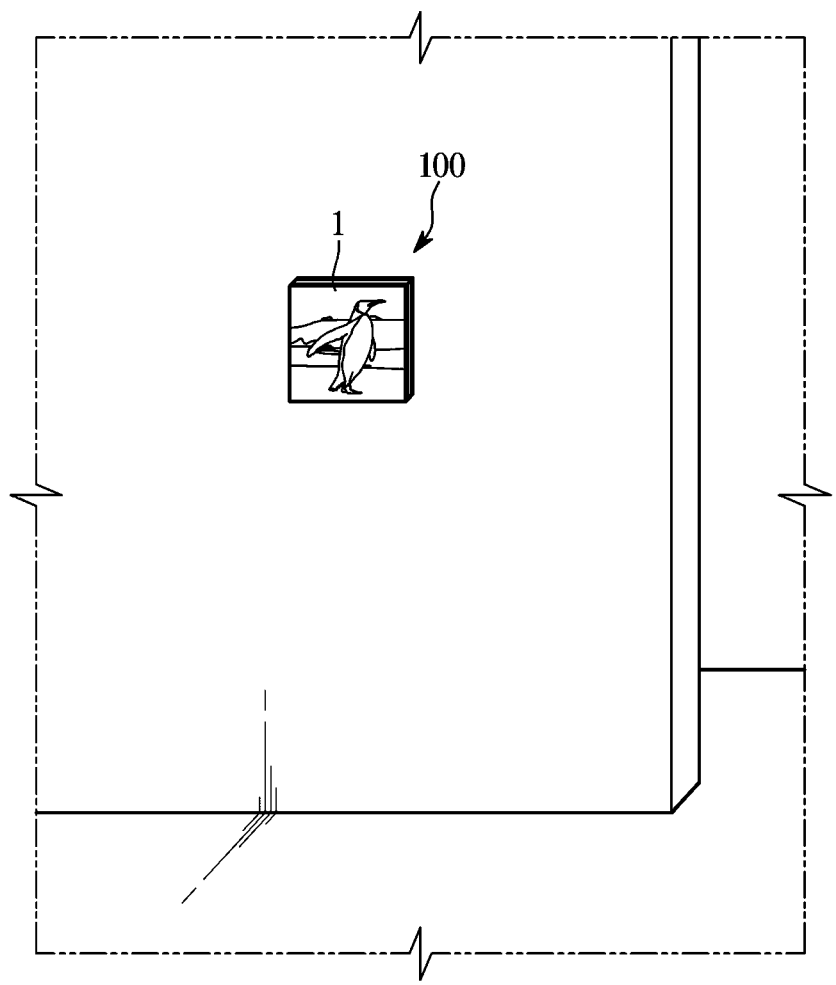
FIGS. 7 to 11 illustrate examples of various uses to which a display assembly according to an embodiment of the present disclosure is applied.
Figure 8:
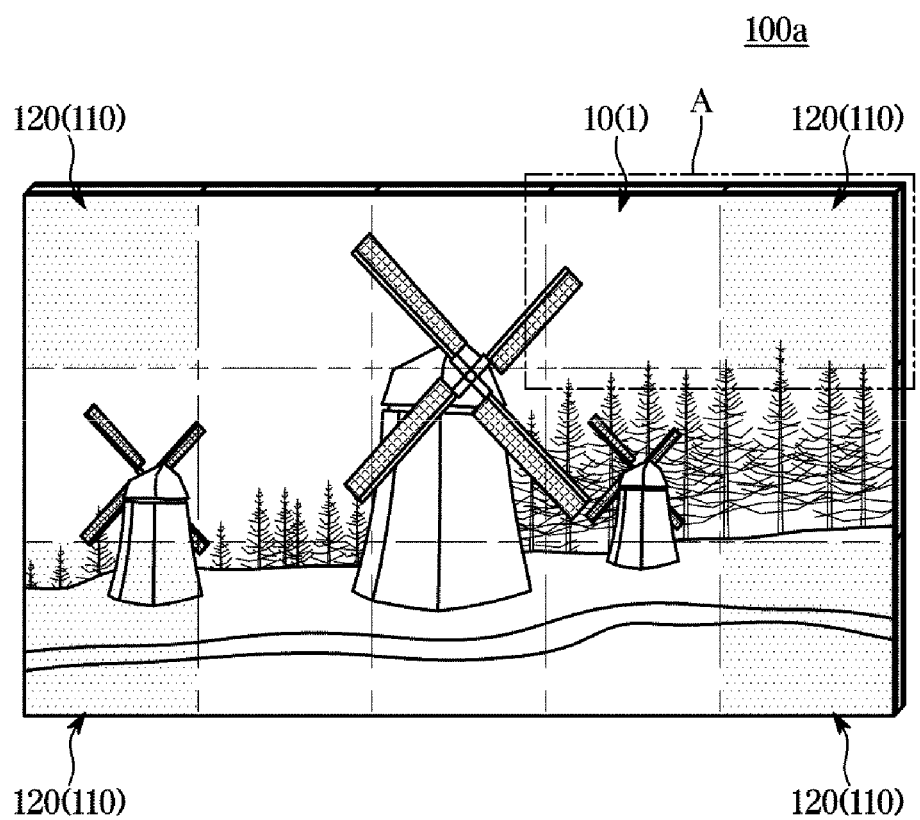
Figure 10:
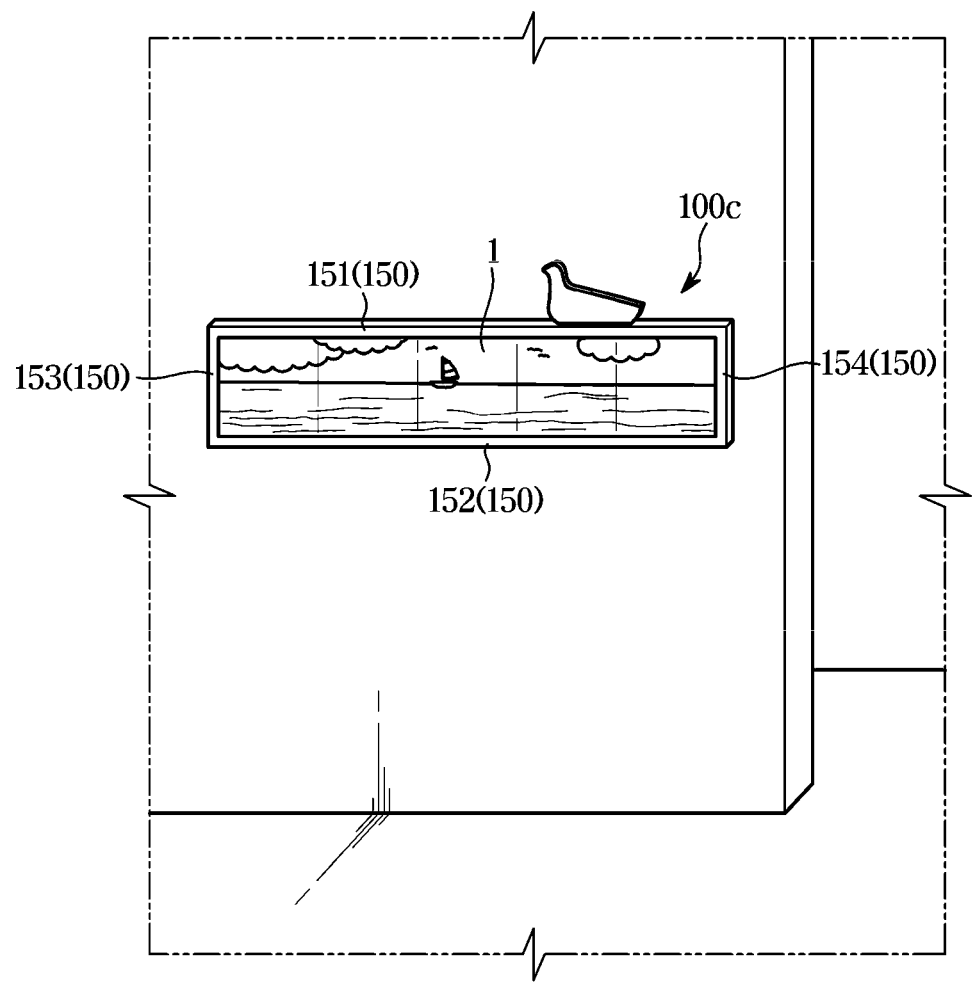
Figure 11:
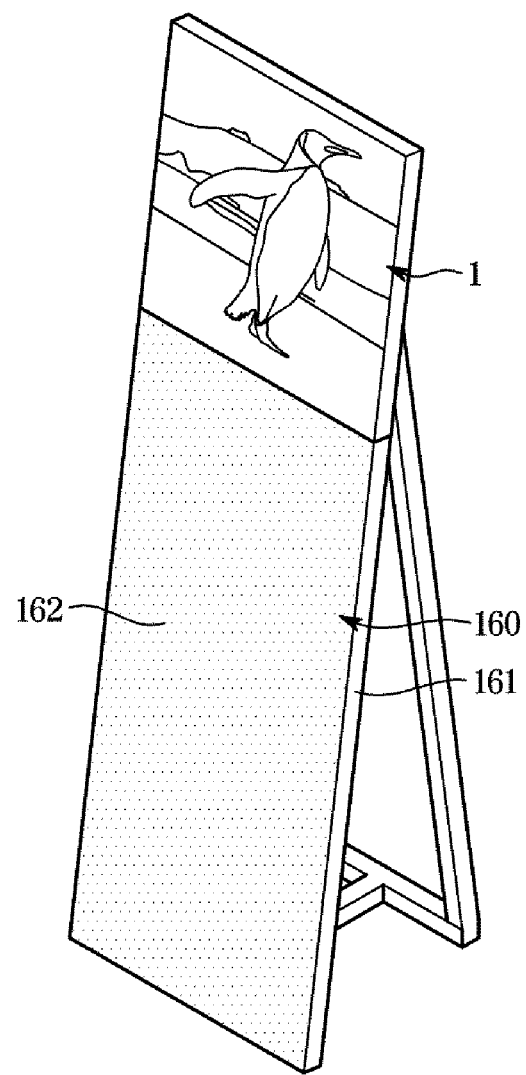
Figure 12A:
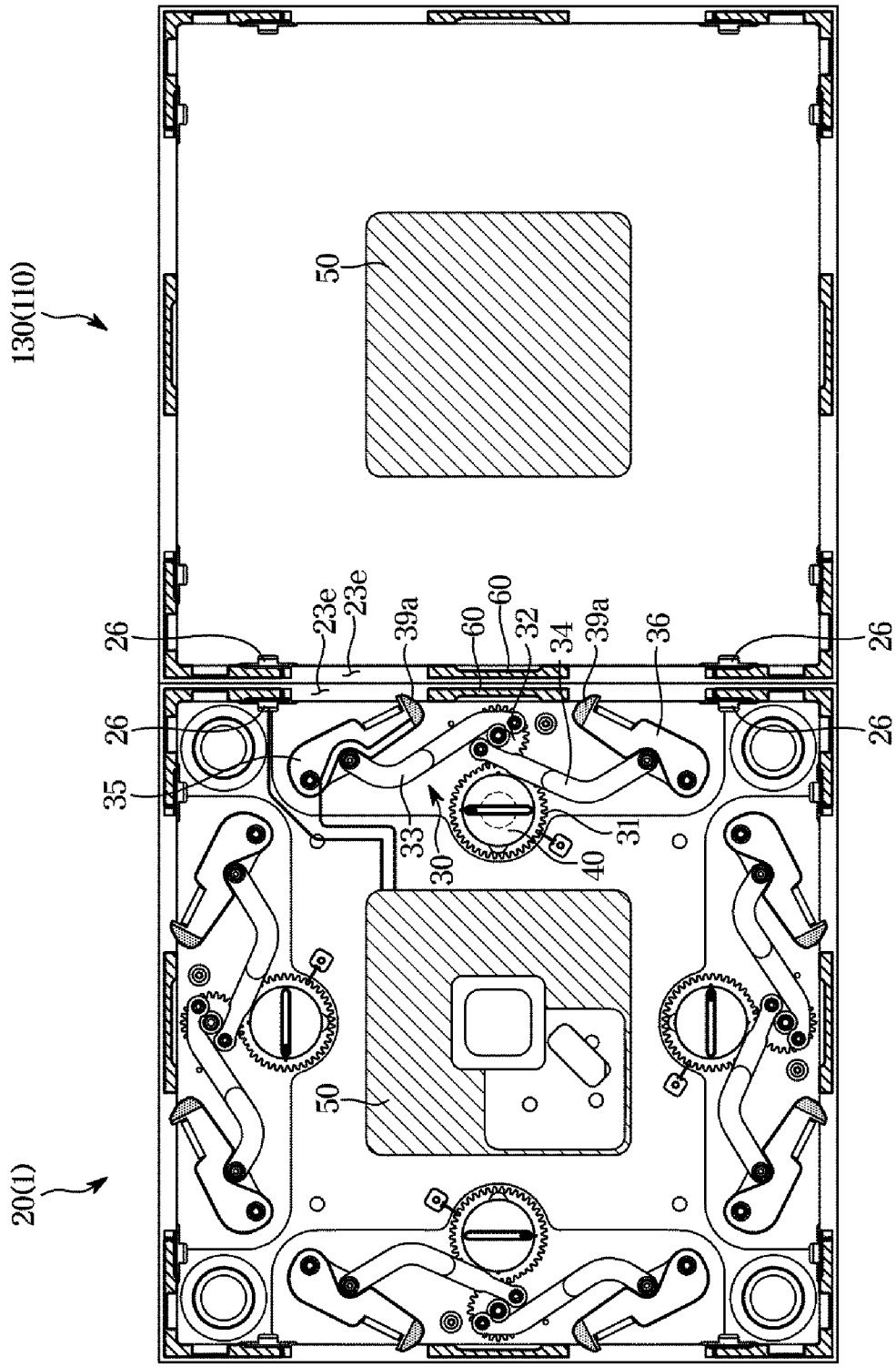
FIGS. 12A and 12B illustrate a process in which a display assembly and a speaker assembly according to an embodiment of the present disclosure in a display apparatus illustrated in FIG. 8 are coupled to each other.
Figure 12B:
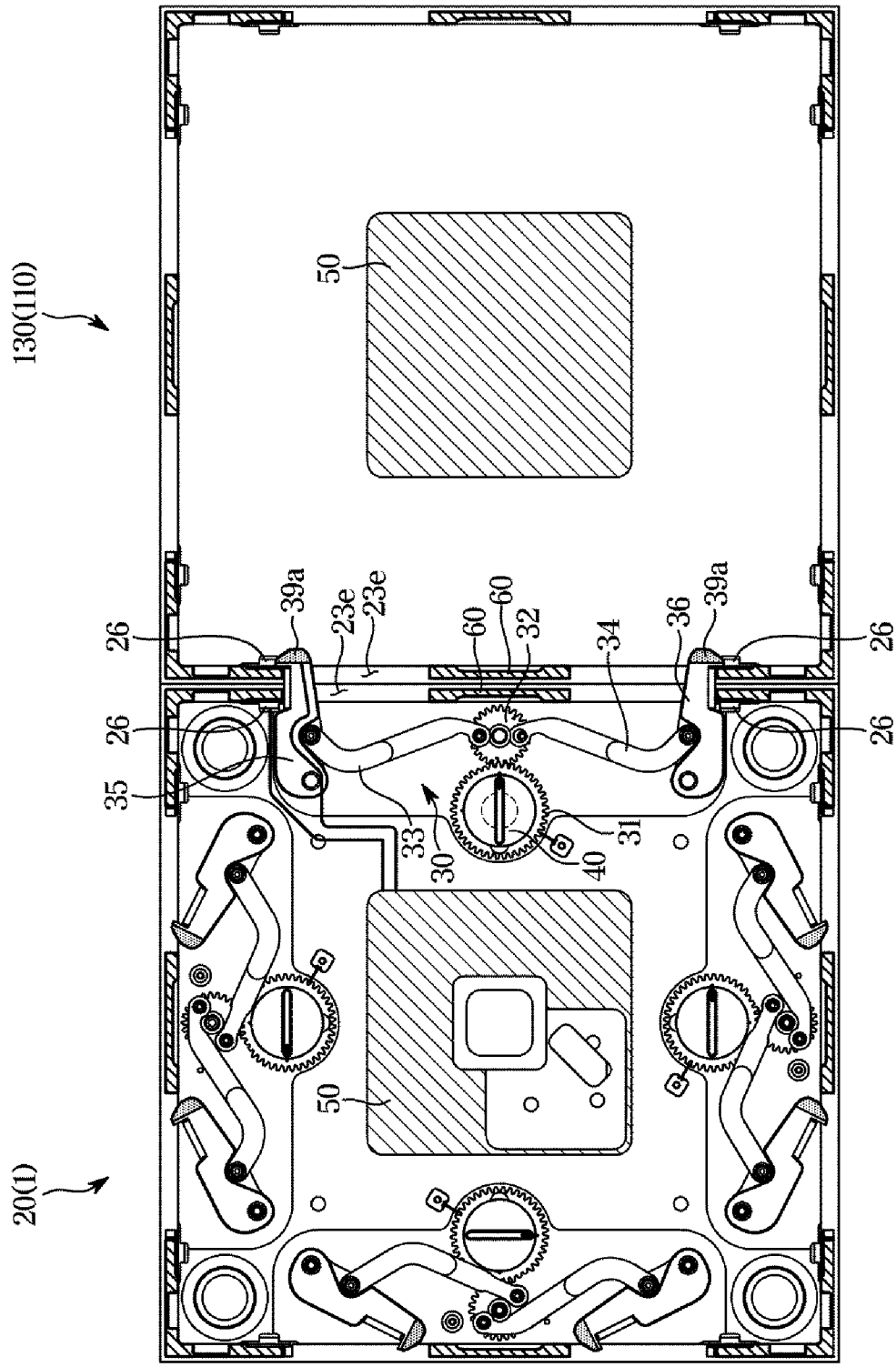

FIGS. 7 to 11 illustrate examples of various uses to which a display assembly according to an embodiment of the present disclosure is applied, and FIGS. 12A and 12B illustrate a process in which a display assembly and a speaker assembly according to an embodiment of the present disclosure in a display apparatus illustrated in FIG. 8 are coupled to each other. For reference, FIGS. 12A and 12B illustrate the coupling process of portion "A" in FIG. 8. The examples of various uses illustrated in FIGS. 7 to 11 may be implemented by the display assembly 1 illustrated in FIG. 1 as well as a display assembly 200 illustrated in FIG. 13.

As illustrated in FIGS. 7 to 11, the display assembly 1 may be implemented with various types of display apparatuses 100, 100a, 100b, 100c and 100d.

As illustrated in FIG. 7, the display apparatus 100 may include one of the display assemblies 1. The display apparatus 100 may be installed on a mounting surface such as a wall to display various images. The display apparatus 100 may provide various items of information to the user such as the date, time, temperature, humidity, and the like. The display apparatus 100 may also include a touch screen. In this case, the user may easily input various commands to the display apparatus 100 using the touch screen. The display apparatus 100 may be equipped with an AI function or an Internet of Things function.

As illustrated in FIGS. 8, 12A and 12B, the display apparatus 100a may include the plurality of display assemblies 1 and an accessory. The accessory may include a plurality of speaker assemblies 110. That is, as the display apparatus 100a includes the plurality of display assemblies 1 and the plurality of speaker assemblies 110, the display apparatus 100a may output an image signal and an acoustic signal together. As an example, the plurality of speaker assemblies 110 may be disposed at the corners of the display apparatus 100a. However, the position of the plurality of speaker assemblies 110 is not limited to the above examples and may be variously changed.

Each of the plurality of speaker assemblies 110 may include a display module 120 and a speaker module 130.

The display module 120 is the same as the display module 10 described with reference to FIGS. 1 to 6B, and thus the description of the display module 120 will be omitted.

The speaker module 130 may be provided to support the display module 120. The speaker module 130 has a structure similar to that of the display module supporter 20 described with reference to FIGS. 1 to 6B, but may include configurations capable of outputting acoustic signals instead of including the fastening members 35 and 36. As an example, an amplifier, a woofer, or the like instead of the fastening members 35 and 36 may be disposed in the internal space of the speaker module 130.

Each of the plurality of speaker assemblies 110 may include the control board 50 like the display assembly 1. The control board 50 may be disposed inside the speaker module 130.

As illustrated in FIGS. 12A and 12B, the display assembly 1 and the speaker assembly 110 may be coupled to each other and at the same time electrically connected by coupling the coupling unit 30 of the display assembly 1 to the slit 23e of the speaker assembly 110.

Specifically, when the user rotates the operation unit 40 of the display assembly 1 in a first direction, the first rotation member 31 of the display assembly 1 rotates integrally with the operation unit 40. As the first rotation member 31 of the display assembly 1 rotates, the second rotation member 32 of the display assembly 1 rotates in a second direction which is the direction opposite to the first direction by being engaged with the first rotation member 31, and a rotational force of the second rotation member 32 of the display assembly 1 is transmitted to the first fastening member 35 and the second fastening member 36 of the display assembly 1 through the first link member 33 and the second link member 34 of the display assembly 1. The first fastening member 35 and the second fastening member 36 may protrude to the outside of the display assembly 1 through the slit 23e formed on the right edge 23d of the side frame 23 of the display assembly 1 by rotating about the fastening member rotating shaft 37. The first fastening member 35 and the second fastening member 36 that protrude to the outside of the display assembly 1 may be coupled to the speaker assembly 110 by being inserted into the slit 23e formed on the left edge 23c of the side frame 23 of the speaker assembly 110. At this time, the second power terminal 39a provided on the first fastening member 35 and the second fastening member 36 of the display assembly 1 may contact the first power terminal 26 provided on the left edge 23c of the side frame 23 of the speaker assembly 110.

The power source may be connected to any one of the display assembly 1 and the speaker assembly 110. As an example, the case where the power source is connected to the display assembly 1 will be described below.

The control board 50 of the display assembly 1 may receive power from the power source. The second power terminal 39a provided on the first fastening member 35 and the second fastening member 36 of the display assembly 1 may receive power from the control board 50 by being electrically connected to the control board 50. The power supplied to the display assembly 1 may be transmitted to the speaker assembly 110 by the contact between the second power terminal 39a provided on the first fastening member 35 and the second fastening member 36 of the display assembly 1 and the first power terminal 26 provided on the side frame 23 of the speaker assembly 110.

The display assembly 1 may receive an image signal and an acoustic signal from the outside. Specifically, the display module 10 of the display assembly 1 may output the image signal inputted to the control board 50 of the display assembly 1 by the coupling of the first connector 18 and the second connector 28 of the display assembly 1. Also, the image signal and the acoustic signal inputted to the display assembly 1 may be transmitted to the speaker assembly 110 through the transmission and reception between the wireless communication modules 60 of the display assembly 1 and the speaker assembly 110. The display module 120 of the speaker assembly 110 may output the image signal transmitted from the display assembly 1, and the speaker module 130 of the speaker assembly 110 may output the acoustic signal transmitted from the display assembly 1. The acoustic signal outputted from the speaker module 130 may be emitted to the outside through the slit 23e formed on the side frame 23 of the speaker assembly 110.

Figure 9:
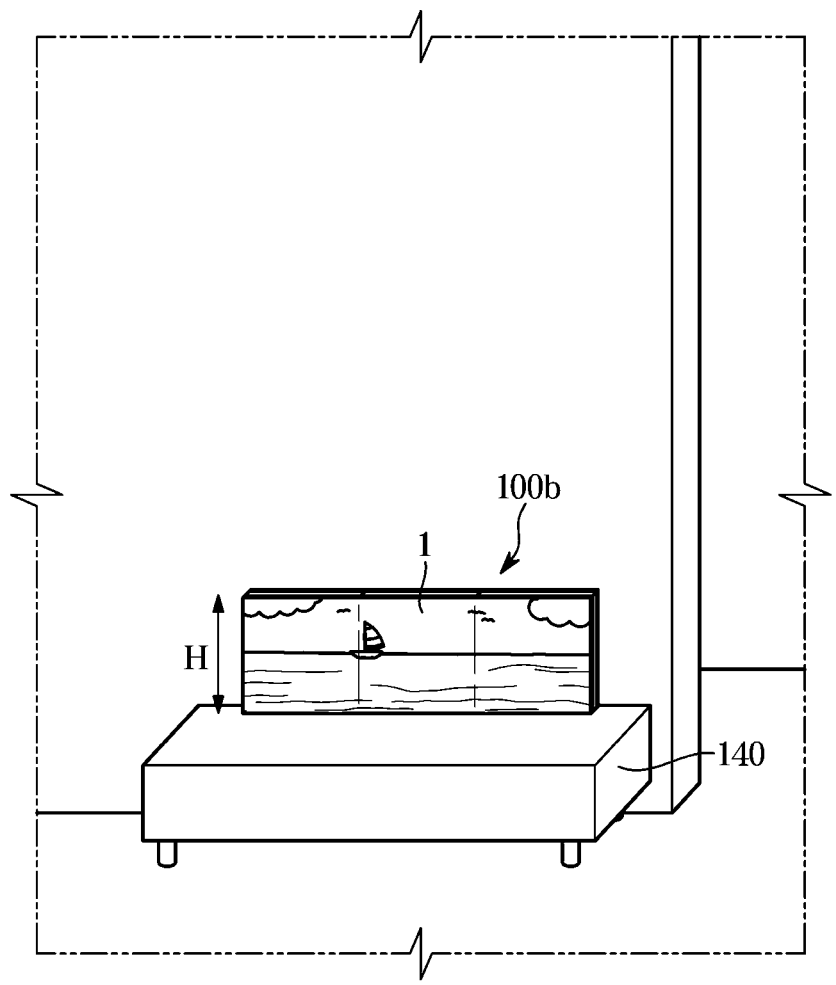

As illustrated in FIG. 9, the display apparatus 100b may include the plurality of display assemblies 1 and may be disposed on a table 140. The display apparatus 100b may be fixedly coupled to the table 140. Specifically, the display apparatus 100b may be fixedly coupled to the table 140 by the coupling of the coupling unit 30 of the plurality of display assemblies 1 and the slit (not shown) of the table 140. As an example, when the display apparatus 100b includes the plurality of display assemblies 1 arranged in a plurality of layers in a height direction H of the display apparatus 100b, the coupling unit 30 of at least one of the plurality of display assemblies 1 arranged in a layer adjacent to the table 140 may be involved in the coupling with the slit of the table 140.

As illustrated in FIG. 10, the display apparatus 100c may include the plurality of display assemblies 1 and an accessory. The accessory may include a shelf 150. The shelf 150 may include an upper frame 151 positioned on an upper side of the plurality of display assemblies 1, a lower frame 152 positioned on a lower side of the plurality of display assemblies 1, and a left frame 153 and a right frame 154 positioned on the left side and the right side of the plurality of display assemblies 1.

A process of mounting the display apparatus 100c on a mounting surface such as a wall will be described below.

One of the display assemblies 1 is fixed to a wall after the cap 29 is detached from one of the display assemblies 1. When one of the display assemblies 1 is fixed to the wall, the display module 10 is detached from the display module supporter 20 and then a plurality of the display module supporters 20 are coupled to each other by an operation of the operation unit 40. The method of coupling the plurality of display module supporters 20 is the same as that described with reference to FIGS. 1 to 6b, and thus the description thereof will be omitted. When the plurality of display module supporters 20 are coupled to each other, one or more of the upper frame 151, the lower frame 152, the left frame 153 and the right frame 154 are coupled to the plurality of display module supporters 20. The coupling of the plurality of display module supporters 20 and the shelf 150 may be achieved by the coupling of the coupling unit 30 of the plurality of display module supporters 20 and a slit (not shown) of the shelf 150. Preferably, when the plurality of display module supporters 20 are coupled to each other, the lower frame 152, the left frame 153 and the right frame 154 may be coupled to the plurality of display module supporters 20. When the plurality of display module supporters 20 and a part of the shelf 150 are coupled, a plurality of the display modules 10 are coupled to the plurality of display module supporters 20. When the plurality of display modules 10 are coupled to the plurality of display module supporters 20, the remaining part of the shelf 150 may be coupled to the plurality of display module supporters 20. Preferably, the upper frame 151 of the shelf 150 may be coupled to the plurality of display module supporters 20. Through the above process, the plurality of display assemblies 1 may be easily assembled or coupled with the shelf 150 without a separate fixing member such as a screw.

At least part of the plurality of display assemblies 1 constituting the display apparatus 100c in the process of mounting the display apparatus 100c on the wall may be fixed to the wall.

However, the process of mounting the display apparatus 100c including the display assemblies 1 and the shelf 150 on a mounting surface such as a wall is not limited to the above-described order, and may be variously changed.

As illustrated in FIG. 11, the display apparatus 100d may include one of the display assemblies 1 and an accessory. The accessory may include a speaker module 160. That is, as the display apparatus 100d includes one of the display assemblies 1 and the speaker module 160, the display apparatus 100d may output an image signal and an acoustic signal together.

The speaker module 160 may include a housing 161 forming an outer appearance, configurations disposed in an internal space formed inside the housing 161 and capable of outputting an acoustic signal such as an amplifier and a woofer, a control board disposed in the internal space, and a wireless communication module provided to be capable of transmitting and receiving acoustic signals to and from the display assembly 1.

A slit may be formed on one wall of the housing 161 of the speaker module 160 facing the display assembly 1 and the first power terminal may be provided on the inner surface of the one wall.

The coupling of the display assembly 1 and the speaker module 160 may be achieved by the coupling of the coupling unit 30 of the display assembly 1 and the slit of the speaker module 160.

The power source may be connected to any one of the display assembly 1 and the speaker module 160. As an example, the case where the power source is connected to the display assembly 1 will be described below.

The control board 50 of the display assembly 1 may receive power from the power source. The second power terminal 39a provided on the first fastening member 35 and the second fastening member 36 of the display assembly 1 may receive power from the control board 50 by being electrically connected to the control board 50. The power supplied to the display assembly 1 may be transmitted to the speaker module 160 by the contact between the second power terminal 39a provided on the first fastening member 35 and the second fastening member 36 of the display assembly 1 and the first power terminal provided on one wall of the speaker module 160.

The display assembly 1 may receive an image signal and an acoustic signal from the outside. Specifically, the display module 10 of the display assembly 1 may output the image signal inputted to the control board 50 of the display assembly 1 by the coupling of the first connector 18 and the second connector 28 of the display assembly 1. Also, the acoustic signal inputted to the display assembly 1 may be transmitted to the speaker module 160 through the transmission and reception between the wireless communication modules 60 of the display assembly 1 and the speaker module 160. The speaker module 160 may output the acoustic signal transmitted from the display assembly 1. The acoustic signal outputted from the speaker module 160 may be emitted to the outside through a plurality of holes 162 formed on the front surface of the housing 161 of the speaker module 160.

Figure 13:
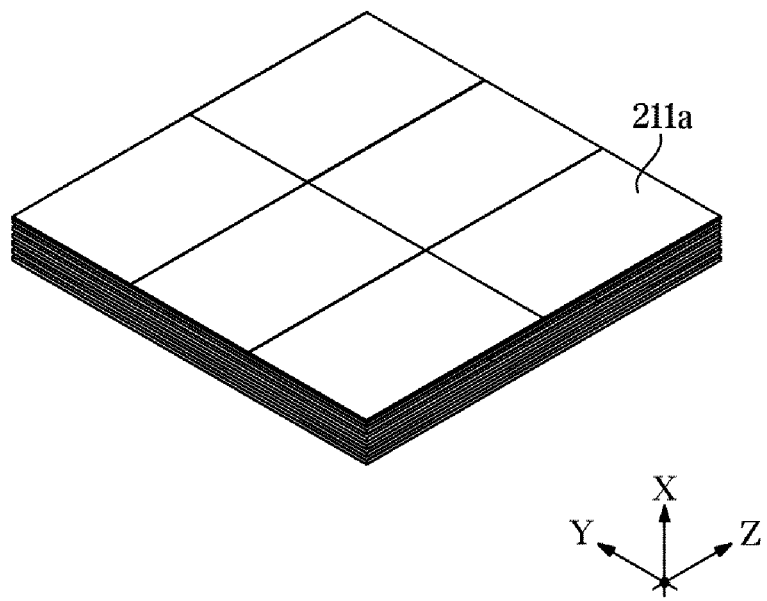
FIG. 13 is a perspective view of a display assembly according to another embodiment of the present disclosure.
Figure 14:
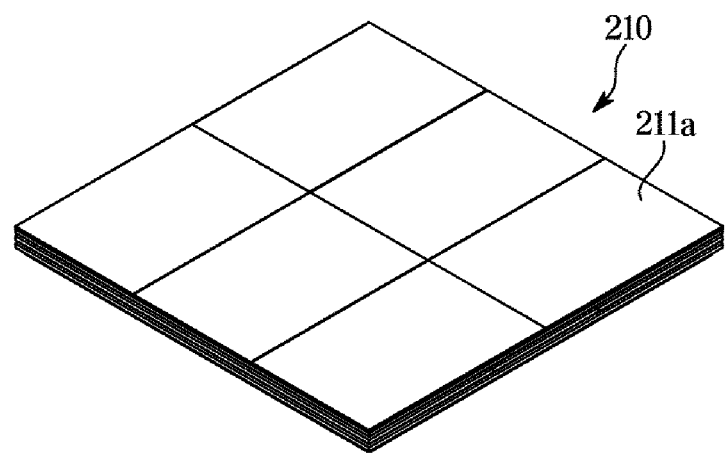
FIG. 14 is an exploded perspective view of a display assembly according to another embodiment of the present disclosure.
Figure 14:
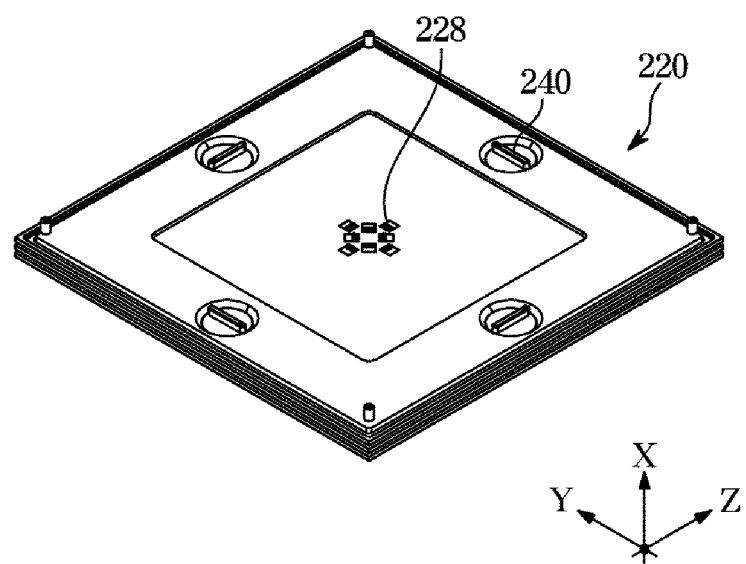

FIG. 13 is a perspective view of a display assembly according to another embodiment of the present disclosure, and FIG. 14 is an exploded perspective view of a display assembly according to another embodiment of the present disclosure. Hereinafter, a description overlapping with that described with reference to FIGS. 1 to 12b will be omitted.

As illustrated in FIGS. 13 and 14, the display assembly 200 may include a display module 210 forming a screen 211a and a display module supporter 220 provided to support the display module 210.

The display module 210 and the display module supporter 220 may be detachably coupled to each other. As an example, the display module 210 and the display module supporter 220 may be detachably coupled to each other by a magnetic force.

The display module 210 and the display module supporter 220 may be electrically connected to each other. The display module 210 and the display module supporter 220 may exchange signals with each other by being electrically connected to each other. The display module 210 and the display module supporter 220 may be electrically connected to each other by the coupling of a first connector 218 (refer to FIG. 15) of a display module 210 and a second connector 228 of the display module supporter 220.

The display assembly 200 may further include a coupling unit 230 (refer to FIG. 16) provided to couple the adjacent display assemblies 200 or a plurality of the display assemblies 200 and an accessory. As an example, the accessory may include a shelf, a speaker, a table, and the like. A detailed description of the coupling unit 230 will be given later.

The display assembly 200 may further include an operation unit 240 coupled to the coupling unit 230 to operate the coupling unit 230. Specifically, the operation unit 240 may be rotatably coupled to the coupling unit 230. The operation unit 240 may be provided on the display module supporter 220 so as to be exposed to the outside of the display module supporter 220. As an example, the operation unit 240 may have a knob shape. However, the shape of the operation unit 240 is not limited to the above example and may be variously changed.

Figure 15:
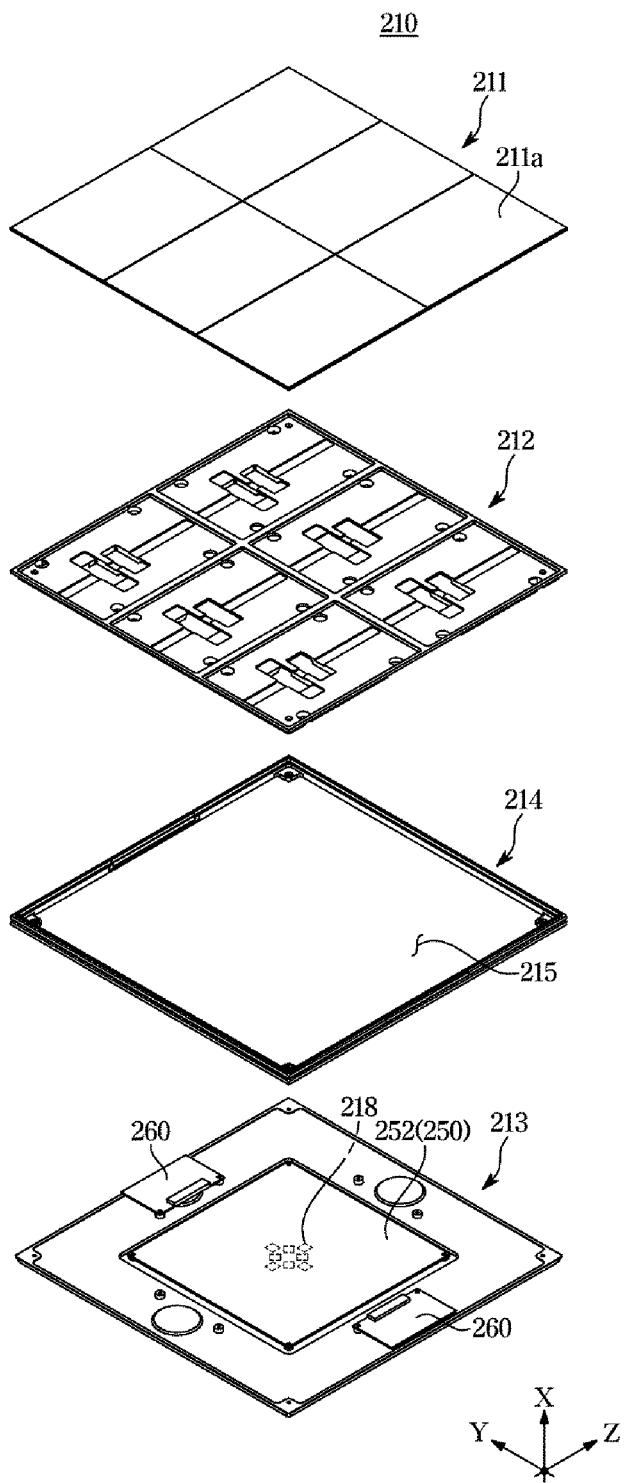
FIG. 15 is an exploded perspective view of a display module of a display assembly according to another embodiment of the present disclosure.
Figure 16:
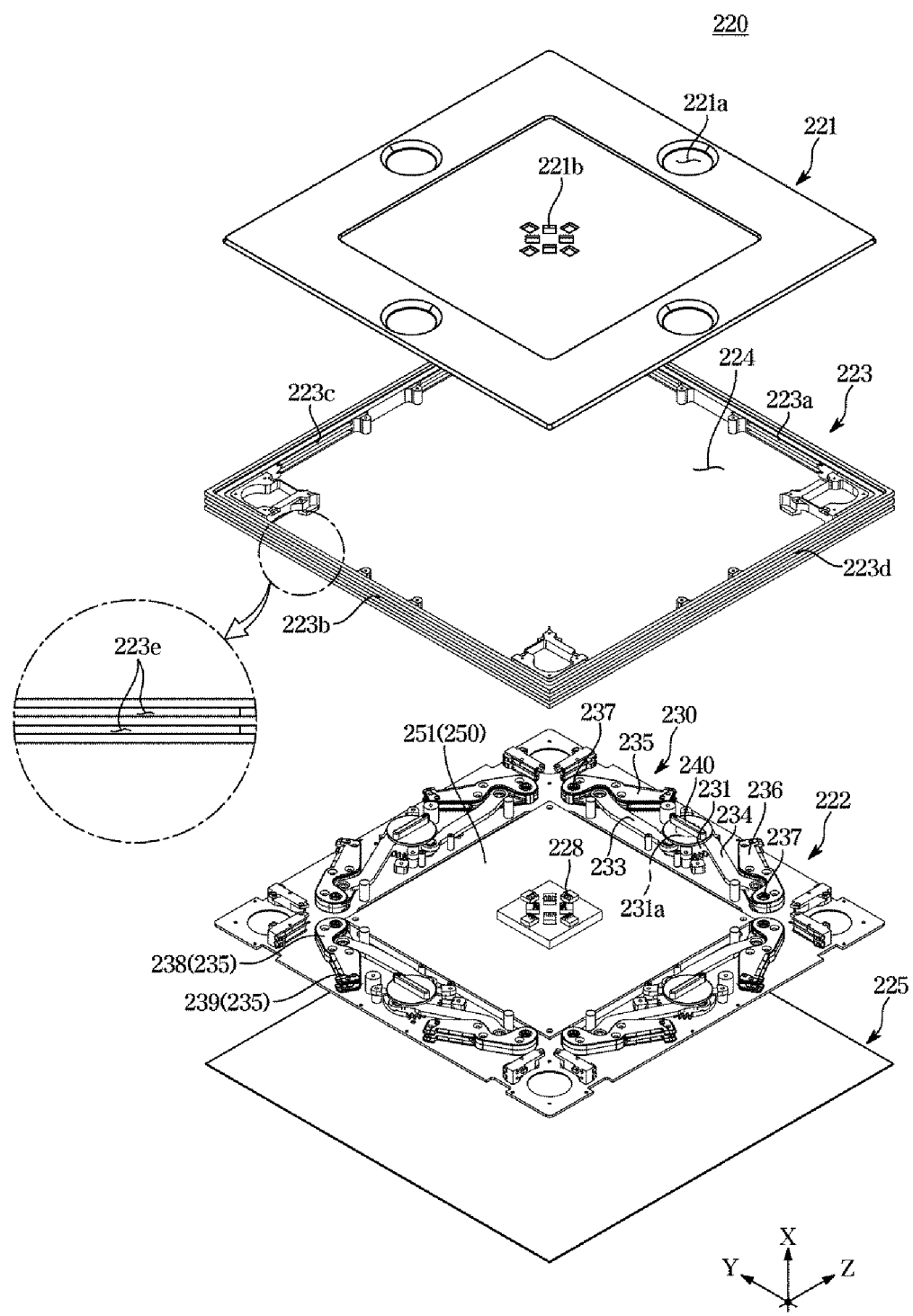
FIG. 16 is an exploded perspective view of a display module support of a display assembly according to another embodiment of the present disclosure.

FIG. 15 is an exploded perspective view of a display module of a display assembly according to another embodiment of the present disclosure, and FIG. 16 is an exploded perspective view of a display module supporter of a display assembly according to another embodiment of the present disclosure.

As illustrated in FIGS. 15 and 16, the display module 210 may include at least one LED panel 211 forming the screen 211a and support frames 212, 213 and 214 provided to support the at least one LED panel 211. The support frames 212, 213 and 214 may include the inner support frame 212 on which the at least one LED panel 211 is disposed, the outer support frame 213 forming a rear surface appearance of the display module 210, and the side support frame 214 connecting the inner support frame 212 and the outer support frame 213. The side support frame 214 may have a substantially picture frame shape. Also, the side support frame 214 may have a serration shape in which a portion protruding outward of the display module 210 and a portion recessed inward of the display module 210 in the thickness direction X of the display module 210 are alternately arranged. However, the shape of the side support frame 214 is not limited to the above example and may be variously changed.

The at least one LED panel 211 may be coupled to the inner support frame 212. As an example, the at least one LED panel 211 may be coupled to the inner support frame 212 by an adhesive member (not shown) or a magnet.

The display module 210 may further include a module internal space 215 defined by the inner support frame 212, the side support frame 214 and the outer support frame 213.

The display module 210 may further include the first connector 218 that is involved in electrical connection between the display module 210 and the display module supporter 220. The first connector 218 may be mounted on the outer support frame 213. Preferably, the first connector 218 may be mounted at a central portion of the outer support frame 213 so as to be coupled to the second connector 228 of the display module supporter 220.

The display module supporter 220 may include a front frame 221 facing the display module 210, a rear frame 222 facing the front frame 221, and a side frame 223 connecting the front frame 221 and the rear frame 222. The display module supporter 220 may further include a supporter internal space 224 defined by the front frame 221, the rear frame 222, and the side frame 223.

The front frame 221 may form a front surface appearance of the display module supporter 220. The front frame 221 may be provided with an operation unit coupling hole 221a through and to which the operation unit 240 passes and is coupled so that the operation unit 240 is exposed to the outside of the display module supporter 220. The front frame 221 may also be provided with a connector coupling hole 221b through and to which the second connector 228 passes and is coupled so that the second connector 228 is exposed to the outside of the display module supporter 220. The second connector 228 coupled to the connector coupling hole 221b of the front frame 221 so as to pass through the connector coupling hole 221b may be coupled to the first connector 218 of the display module 210. The connector coupling hole 221b may be formed at a central portion of the front frame 221. In another aspect, the connector coupling hole 221b may be formed on the front frame 221 so as to be positioned inside the operation unit coupling hole 221a. That is, the connector coupling hole 221b may be surrounded by a plurality of the operation unit coupling holes 221a.

The side frame 223 may form an outer surface appearance of the display module supporter 220. The side frame 223 may have a substantially picture frame shape. The side frame 223 may include an upper edge 223a, a lower edge 223b facing the upper edge 223a, and a left edge 223c and a right edge 223d connecting the upper edge 223a and the lower edge 223b and facing each other.

A slit 223e may be formed on the side frame 223. The slit 223e may be formed on the side frame 223 so as to correspond to the coupling unit 230 provided inside the display module supporter 220. Specifically, the slit 223e may be formed on the upper edge 223a, the lower edge 223b, the right edge 223d and the left edge 223c of the side frame 223. More specifically, a pair of the slits 223e adjacent to each other in the front-rear direction may be formed on the upper edge 223a, the lower edge 223b, the right edge 223d and the left edge 223c of the side frame 223. The slits 223e are not only involved in the coupling of the adjacent display assemblies 1 or the display assembly 1 and the accessory but may also serve as a passage through which the heat generated in the internal space of the display module supporter 220, that is, the supporter internal space 224, radiates to the outside of the display module supporter 220.

A first power terminal 226 (refer to FIG. 18A) may be mounted on the side frame 223. The first power terminal 226 may be mounted on an inner wall of the side frame 223. The first power terminal 226 may be disposed to be adjacent to the slit 223e. The first power terminal 226 may be involved in power transmission between the adjacent display assemblies 1 or the plurality of display assemblies 1 and the accessory together with a second power terminal 239a of the coupling unit 230.

The side frame 223 may have a serration shape in which a portion protruding outward of the display module supporter 220 and a portion recessed inward of the display module supporter 220 in the thickness direction X of the display module supporter 220 are alternately arranged. However, the shape of the side frame 223 is not limited to the above example and may be variously changed.

The coupling unit 230 may be installed on the rear frame 222. Specifically, the coupling unit 230 may be installed on the rear frame 222 so as to be positioned in the supporter internal space 224. Preferably, the display assembly 200 may include a plurality of the coupling units 230. The respective coupling units 230 may be provided at edge portions of the rear frame 222 so as to be adjacent to the upper edge 223a, the lower edge 223b, the left edge 223c and the right edge 223d of the side frame 223. As such, the plurality of coupling units 230 are provided so as to correspond to the respective edges 223a, 223b, 223c and 223d of the side frame 223, so that the plurality of adjacent display assemblies 1 may freely be coupled to each other in the up-down direction or the left-right direction.

The display module supporter 20 may further include a rear cover 225 coupled to the rear frame 222 so as to form a rear surface appearance of the display module supporter 220.

The display assembly 200 may further include a control board 250 to control the power and signals of the display assembly 200. Specifically, the control board 250 may include a power control board 251 to control the power of the display assembly 200 and an image signal control board 252 to control an image signal of the display assembly 200. The power control board 251 may be disposed inside any one of the display module 210 and the display module supporter 220. The image signal control board 252 may be disposed inside the other of the display module 210 and the display module supporter 220. Preferably, the power control board 251 may be disposed in the supporter internal space 224 of the display module supporter 220, and the image signal control board 252 may be disposed in the module internal space 215 of the other of the display module 210.

When the power control board 251 is disposed in the supporter internal space 224 of the display module supporter 220, the power control board 251 may be mounted on the rear frame 222. The power control board 251 may be installed at a central portion of the rear frame 222 so as to be surrounded by the plurality of coupling unit 230. The second connector 228 may be mounted on the power control board 251 such that the second connector 228 is coupled to the connector coupling hole 221b of the front frame 221 and exposed to the outside of the display module supporter 220. When power is supplied to the power control board 250 by a power source (not shown), the power control board 251 may transmit power to the display module 210 through the coupling of the first connector 218 and the second connector 228. The first power terminal 226 provided on the side frame 223 and the second power terminal 239a (refer to FIG. 18A) provided on fastening members 235 and 236 of the coupling unit 230 may be electrically connected to the power control board 251 by a cable 280.

When the image signal control board 252 is disposed in the module internal space 215 of the other of the display module 210, the image signal control board 252 may be installed on the outer support frame 213. The image signal control board 252 may be installed at a central portion of the outer support frame 213. The first connector 218 may be mounted on the image signal control board 252 such that the first connector 218 is exposed to the outside of the display module 210. The image signal control board 252 may receive power from the power control board 251 through the coupling of the first connector 218 and the second connector 228.

The display assembly 200 may further include a wireless communication module 260 disposed inside any one of the display module 210 and the display module supporter 220 together with the image signal control board 252 so that the plurality of adjacent display assemblies 200 transmit and receive signals to each other. Preferably, the wireless communication module 260 may be disposed in the internal space of the display module 210, that is, the module internal space 215. The wireless communication module 260 may include a short-range wireless communication module. Signals that may be transmitted and received through the wireless communication module 260 may include an image signal. The wireless communication module 260 may be mounted on the outer support frame 213. Preferably, the display assembly 200 may include a plurality of the wireless communication modules 260, and the plurality of wireless communication modules 260 may be mounted on the outer support frame 213 to face each other with the image signal control board 252 interposed therebetween.

The display assembly 200 may further include the coupling unit 230. Preferably, the display assembly 200 may further include a plurality of the coupling units 230.

Each of the plurality of coupling units 230 may include a rotation member 231 coupled to the operation unit 240 to rotate integrally with the operation unit 240, the fastening members 235 and 236 provided to be capable of protruding outside the slit 223e according to an operation of the operation unit 240, and link members 233 and 234 to connect the rotation member 231 and the fastening members 235 and 236.

The rotation member 231 may rotate about a rotation member rotating shaft 231a. The operation unit 240 may rotate integrally with the rotation member 231 by being coupled to the rotation member rotating shaft 231a.

The fastening members 235 and 236 may be provided to be rotatable about a fastening member rotating shaft 237. The fastening members 235 and 236 may include a fastening member body 238 and a plurality of arms 239 extending from the fastening member body 238. The plurality of arms 239 may be spaced apart a predetermined distance in the thickness direction X of the display module supporter 220. The fastening member rotating shaft 237 may be fixed to the rear frame 222 by passing through the fastening member body 238 and being coupled to the fastening member body 238. The plurality of arms 239 of the fastening members 235 and 236 are inserted into a pair of the slits 223e, respectively, according to an operation of the operation unit 240, so that the plurality of arms 239 may protrude to the outside of the display module supporter 220. The second power terminal 239a may be formed on the plurality of arms 239.

The link members 233 and 234 may connect the rotation member 231 and the fastening members 235 and 236. Specifically, one end of the link members 233 and 234 may be coupled to the rotation member 231 and the other of the link members 233 and 234 may be coupled to the fastening member body 238 of the fastening members 235 and 236. The link members 233 and 234 function to transmit the movement of the rotation member 231 to the fastening members 235 and 236.

Preferably, each of the plurality of coupling units 230 may include a plurality of the fastening members 235 and 236. Specifically, the plurality of fastening members 235 and 236 may include the first fastening member 235 and the second fastening member 236.

Preferably, each of the plurality of coupling units 230 may include a plurality of the link members 233 and 234. Specifically, the plurality of link members 233 and 234 may include the first link member 233 connecting the rotation member 231 and the first fastening member 235, and the second link member 234 connecting the rotation member 231 and the second fastening member 236. One end of the first link member 233 coupled to the rotation member 231 may be positioned on the opposite side of one end of the second link member 234 coupled to the rotation member 231 about the rotation member rotating shaft 231a.

The fastening member rotating shaft 237 may be disposed further inside the display module supporter 220 more than the rotation member rotating shaft 231a.

Figure 17:
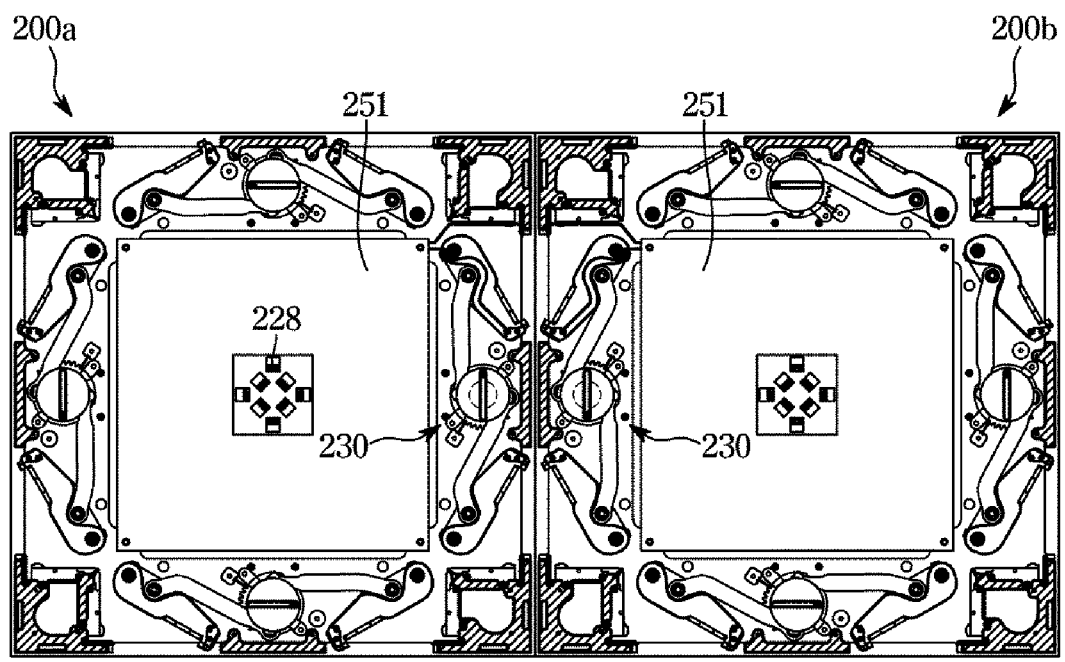
FIG. 17 illustrates a first display assembly and a second display assembly adjacent to each other in a display assembly according to another embodiment of the present disclosure.
Figure 18A:
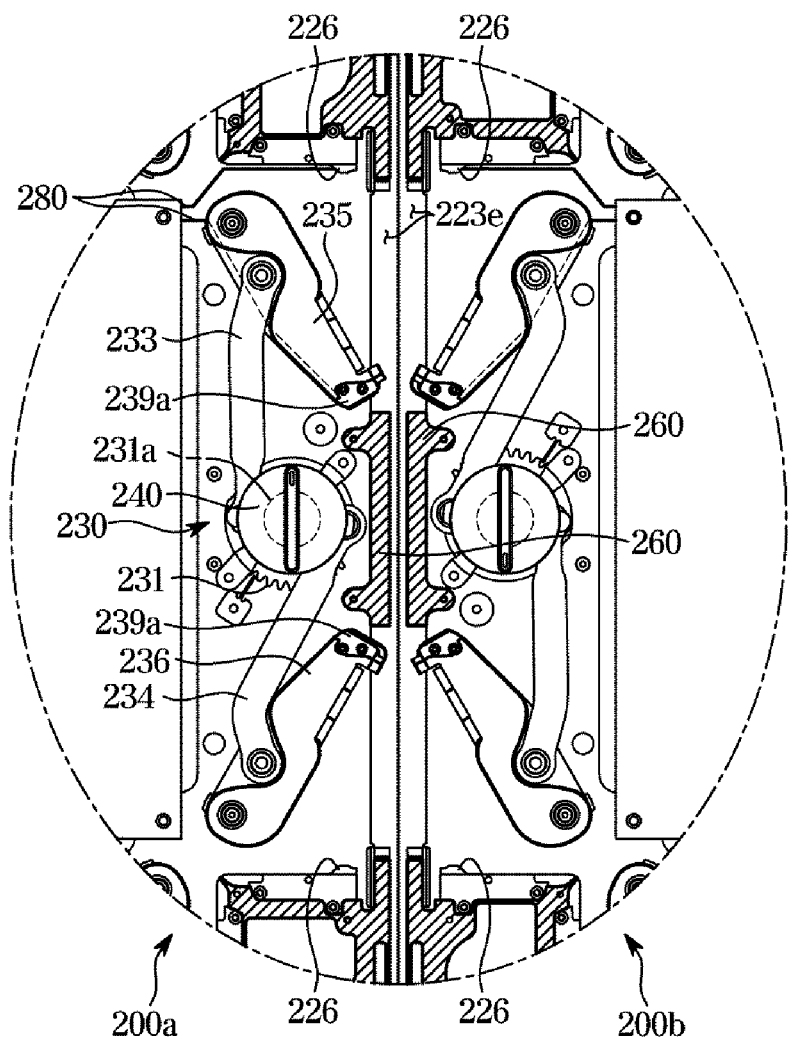
FIGS. 18A and 18B are enlarged views of a portion of FIG. 17 to illustrate a process in which the first display assembly and the second display assembly are coupled to each other.
Figure 18B:
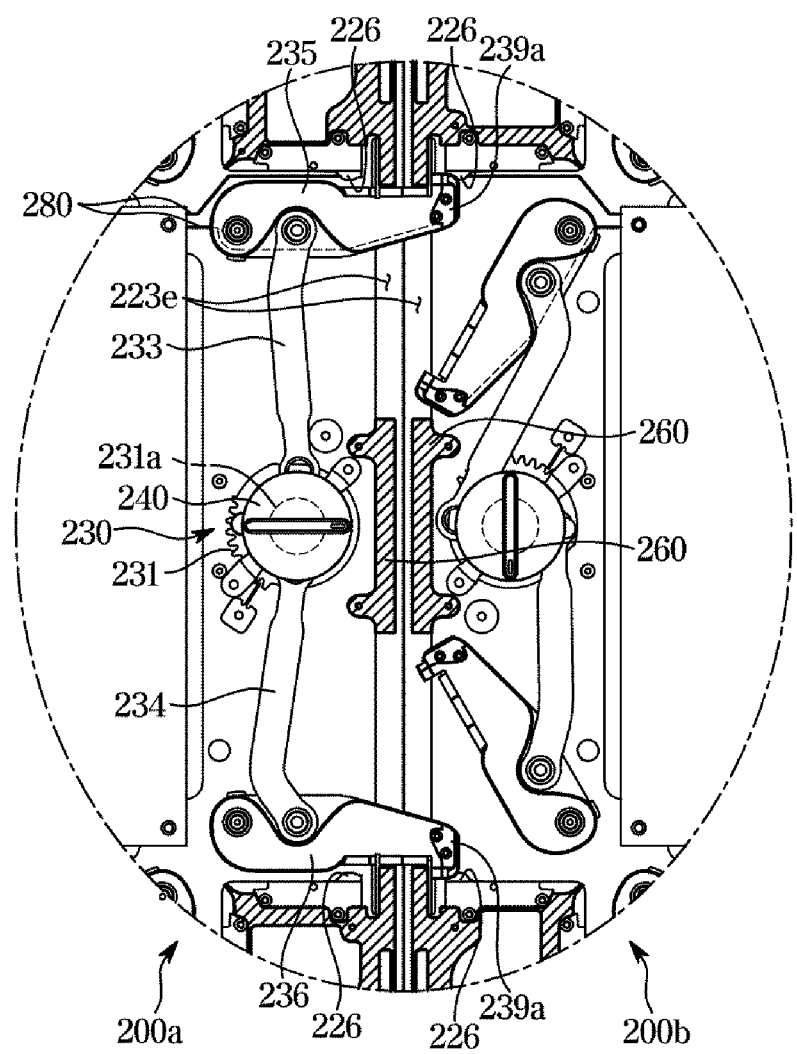

FIG. 17 illustrates a first display assembly and a second display assembly adjacent to each other in a display assembly according to another embodiment of the present disclosure, and FIGS. 18A and 18B are enlarged views of a portion of FIG. 17 to illustrate a process in which the first display assembly and the second display assembly are coupled to each other.

As illustrated in FIGS. 17, 18A and 18B, the display assembly 200 may include a first display assembly 200a and a second display assembly 200b adjacent to the first display assembly 200a.

The first display assembly 200a and the second display assembly 200b may be coupled to each other by the coupling unit 230.

When any one of the coupling units 230 of the first display assembly 200a and the second display assembly 200b is coupled to the other one of the slits 223e of the first display assembly 200a and the second display assembly 200b, the first display assembly 200a and the second display assembly 200b may be coupled to each other and at the same time electrically connected.

As an example, the case where the first display assembly 200a and the second display assembly 200b that are adjacent to each other in the left-right direction are physically coupled and electrically connected to each other as the coupling unit 230 of the first display assembly 200a is coupled to the slit 223e of the second display assembly 200b will be described below.

The display module 210 of the first display assembly 200a and the display module 210 of the second display assembly 200b may be separated from the display module supporter 220 of the first display assembly 200a and the display module supporter 220 of the second display assembly 200b so that the operation unit 240 of the respective display modules 210 is exposed to the outside. Thereafter, when the user rotates the operation unit 240 of the first display assembly 200a in the first direction, the rotation member 231 of the first display assembly 200a rotates integrally with the operation unit 240. A rotational force of the rotation member 231 of the first display assembly 200a is transmitted to the first fastening member 235 and the second fastening member 236 of the first display assembly 200a through the first link member 233 and the second link member 234 of the first display assembly 200a. The first fastening member 235 and the second fastening member 236 may protrude to the outside of the first display assembly 200a through the slit 223e formed on the right edge 223d of the side frame 223 of the first display assembly 200a by rotating about the fastening member rotating shaft 237. The first fastening member 235 and the second fastening member 236 that protrude to the outside of the first display assembly 200a may be coupled to the second display assembly 200b by being inserted into the slit 223e formed on the left edge 223c of the side frame 223 of the second display assembly 200b. At this time, the second power terminal 239a provided on the first fastening member 235 and the second fastening member 236 of the first display assembly 200a may contact the first power terminal 226 provided on the left edge 223c of the side frame 223 of the second display assembly 200b. When the coupling of the display module supporter 220 of the first display assembly 200a and the display module supporter 220 of the second display assembly 200b is completed, the display module 210 of the first display assembly 200a may be coupled to the display module supporter 220 of the first display assembly 200a, and the display module 210 of the second display assembly 200b may be coupled to the display module supporter 220 of the second display assembly 200b.

The power source may be connected to any one of the first display assembly 200a and the second display assembly 200b. As an example, the case where the power source is connected to the first display assembly 200a will be described below.

The power control board 251 of the first display assembly 200a may receive power from the power source. The second power terminal 239a may receive power from the power control board 251 because the second power terminal 239a provided on each the first fastening member 235 and the second fastening member 236 of the first display assembly 200a is electrically connected to the power control board 251 by the cable 280. The power supplied to the first display assembly 200a may be transmitted to the second display assembly 200b by the contact between the second power terminal 239a provided on the first fastening member 235 and the second fastening member 236 of the first display assembly 200a and the first power terminal 226 provided on the side frame 223 of the second display assembly 200b.

The first display assembly 200a may also receive an image signal from the outside. Particularly, the image signal control board 252 of the first display assembly 200a may receive an image signal from the outside. The image signal control board 252 of the first display assembly 200a may receive power from the power control board 251 of the first display assembly 200a by the coupling of the first connector 218 and the second connector 228 of the first display assembly 200a. The image signal control board 252 of the first display assembly 200a that receives power from the power control board 251 of the first display assembly 200a may cause the display module 210 of the first display assembly 200a to output an image signal. Also, the signal inputted to the image signal control board 252 of the first display assembly 200a may be transmitted to the image signal control board 252 of the second display assembly 200b through the transmission and reception between the wireless communication modules 260 of the first display assembly 200a and the second display assembly 200b. The image signal control board 252 of the second display assembly 200b may allow the display module 210 of the second display assembly 200b to output the image signal received from the first display assembly 200a.

Figure 19:
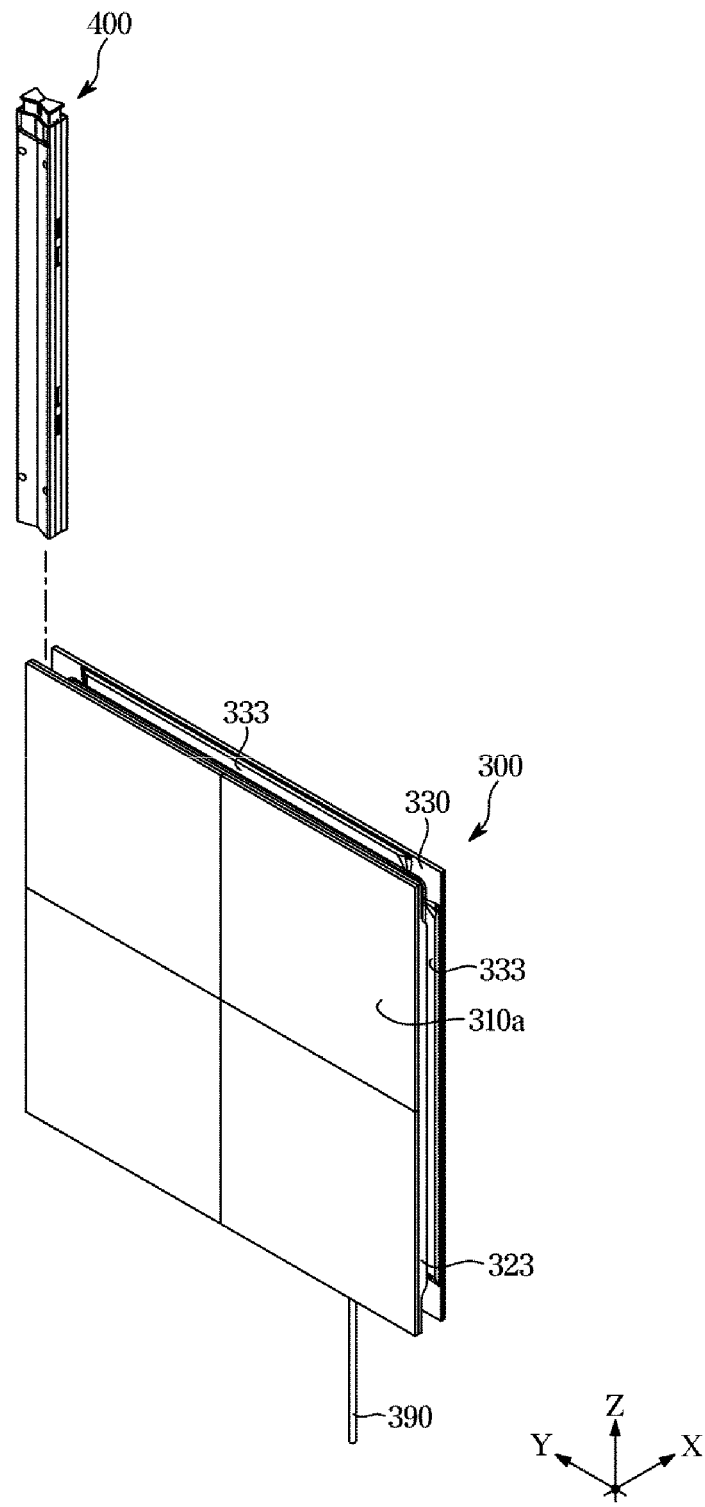
FIG. 19 is a perspective view of a display assembly and a coupler according to another embodiment of the present disclosure.
Figure 20:
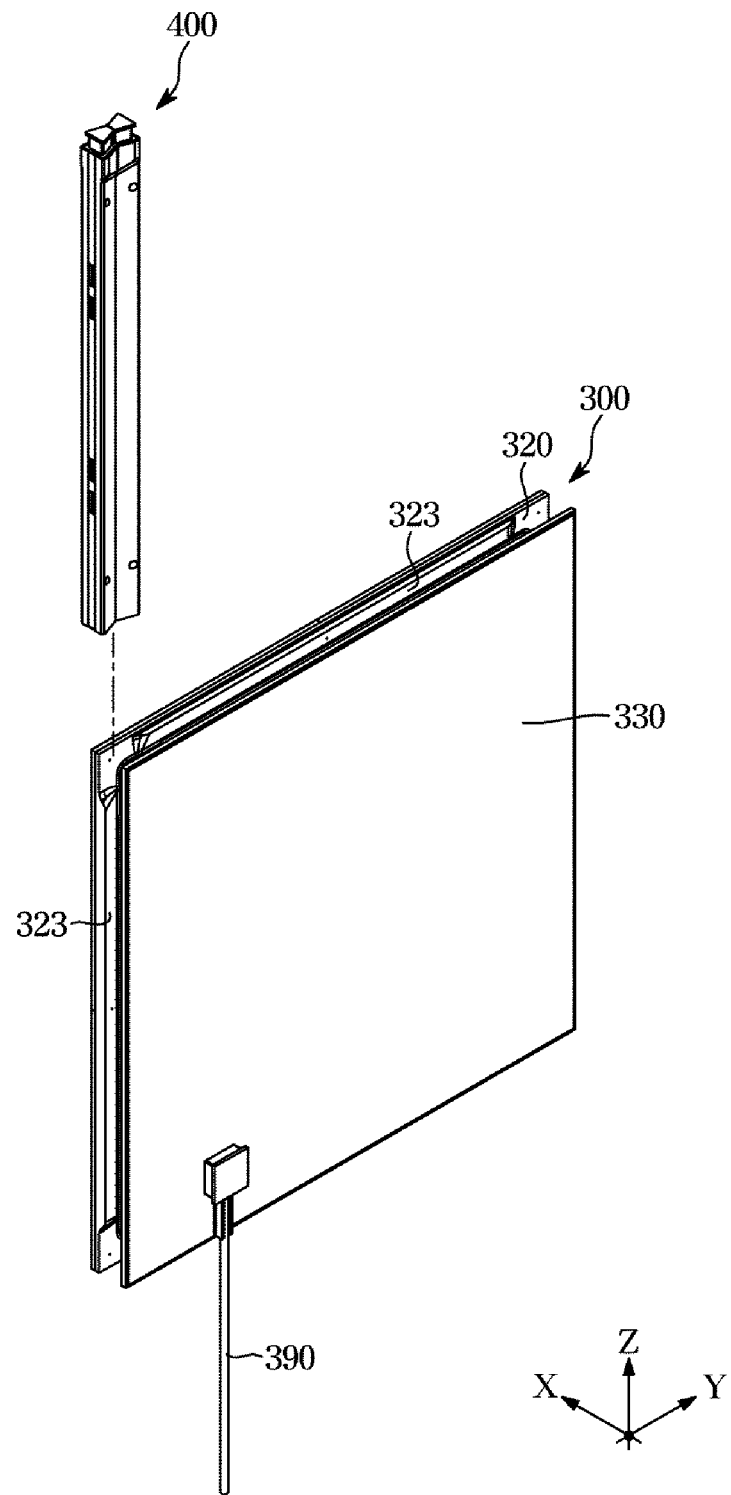
FIG. 20 is a rear perspective view of a display assembly and a coupler according to another embodiment of the present disclosure.
Figure 21:
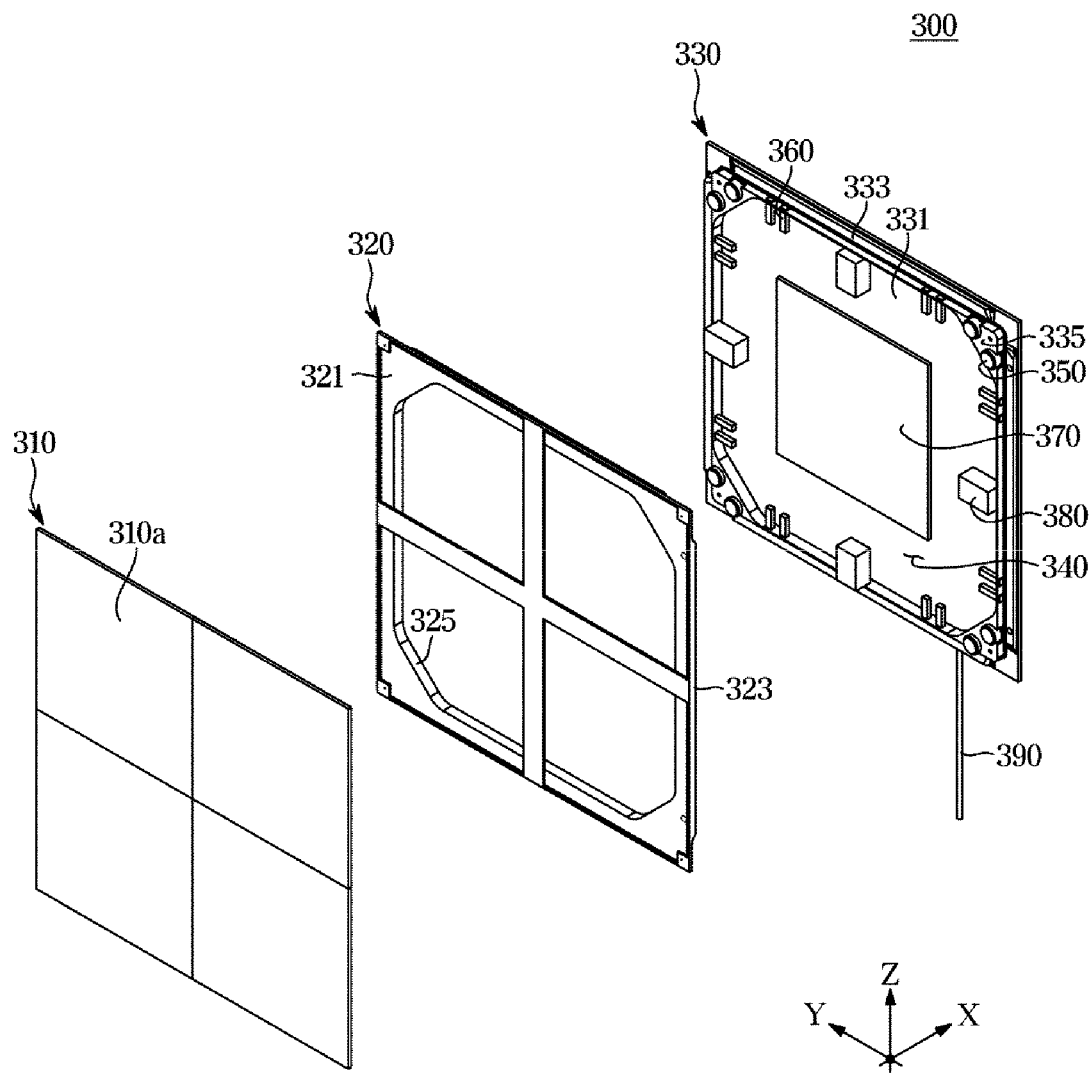
FIG. 21 is an exploded perspective view of a display assembly according to another embodiment of the present disclosure.
Figure 22:
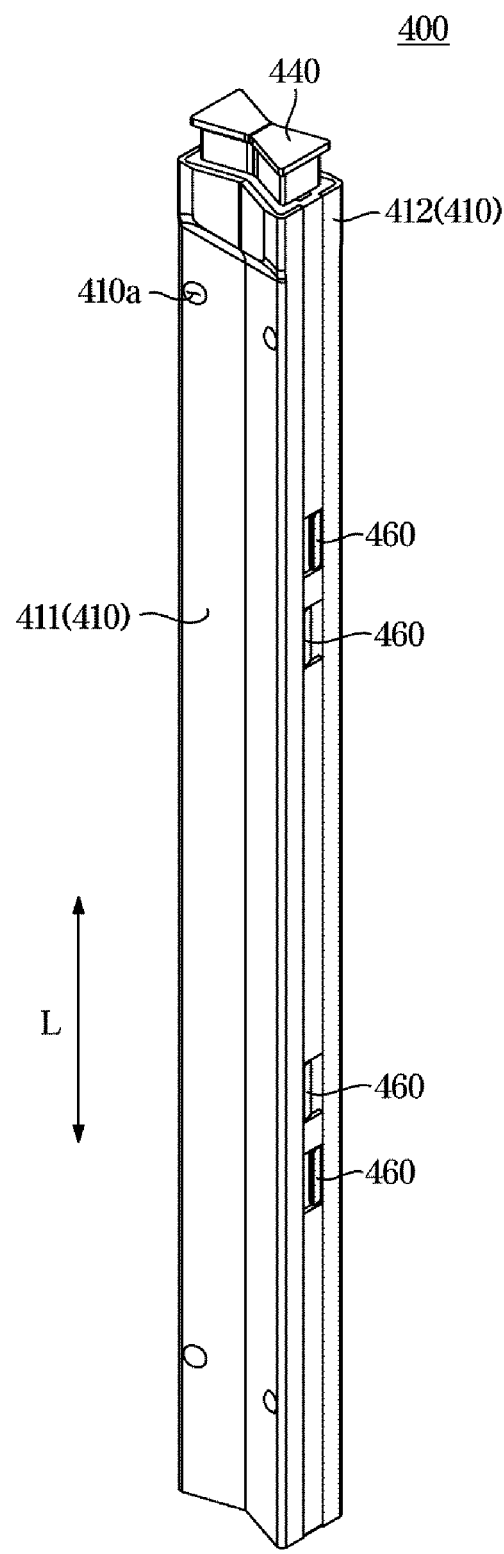
FIG. 22 is an enlarged perspective view of a coupler coupled to a display assembly according to another embodiment of the present disclosure.
Figure 23:
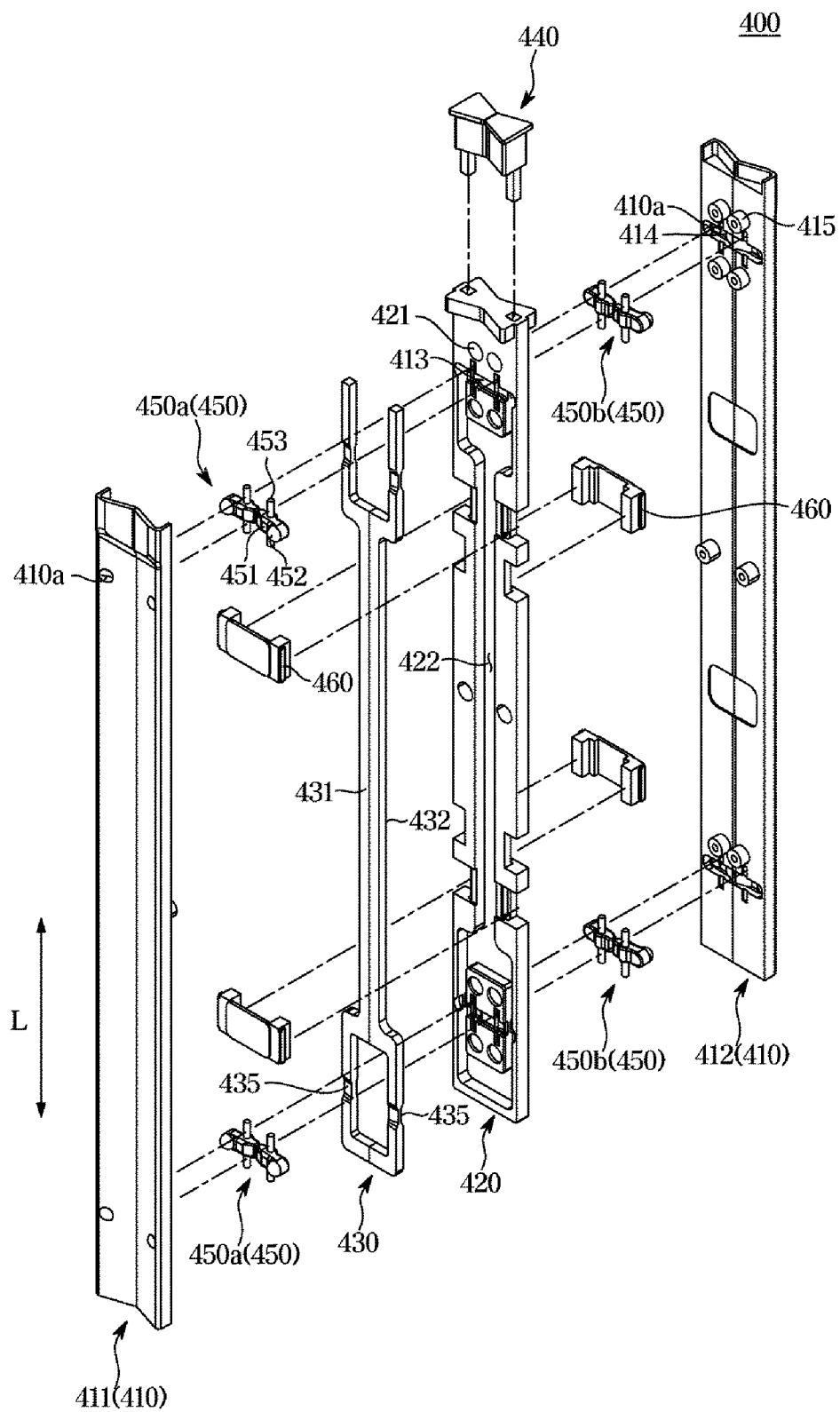
FIG. 23 is an exploded perspective view of the coupler illustrated in FIG. 22.

FIG. 19 is a perspective view of a display assembly and a coupling unit according to another embodiment of the present disclosure, and FIG. 20 is a rear perspective view of a display assembly and a coupling unit according to another embodiment of the present disclosure. FIG. 21 is an exploded perspective view of a display assembly according to another embodiment of the present disclosure, and FIG. 22 is an enlarged perspective view of a coupling unit coupled to a display assembly according to another embodiment of the present disclosure. FIG. 23 is an exploded perspective view of the coupling unit illustrated in FIG. 22.

As illustrated in FIGS. 19 to 23, a display assembly 300 may be detachably coupled to the adjacent display assembly 300 by a coupling unit 400.

The display assembly 300 may be freely coupled to the adjacent display assembly 300 in the up-down direction or the left-right direction by the coupling unit 400.

The coupling unit 400 may be detachably coupled to one side of the display assembly 300. As an example, the coupling unit 400 may be detachably coupled to one side of the display assembly 300 in a sliding manner.

The display assembly 300 may include at least one LED panel 310 forming a screen 310a, an inner frame 320 provided to support the at least one LED panel 310, and an outer frame 330 coupled to the inner frame 320 to form a rear surface appearance of the display assembly 300. The display assembly 300 may further include an internal space 340 defined by the coupling of the inner frame 320 and the outer frame 330.

The inner frame 320 may include a first surface 321 on which the at least one LED panel 310 is disposed, and a second surface 322 (refer to FIG. 26A) facing the outer frame 330.

The inner frame 320 may further include a plurality of guides 323 formed at edges of the inner frame 320 to guide the coupling unit 400. The plurality of guides 323 may be formed on the second surface 322 of the inner frame 320. Specifically, the respective guides 323 may be formed at an upper edge, a lower edge, a left edge and a right edge of the second surface 322 of the inner frame 320. The plurality of guides 323 may be formed along a circumference of the second surface 322 of the inner frame 320 to be spaced apart from each other.

Each of the plurality of guides 323 may include an outer end 323a (refer to FIG. 26A) directing an outer side of the inner frame 320 and an inner end 323b (refer to FIG. 26A) directing an inner side of the inner frame 320 and facing an inner wall 325 of the inner frame 320. The inner end 323b may be positioned on the opposite side of the outer end 323a. The plurality of guides 323 may have a shape corresponding to the shape of the coupling unit 400 moving along the plurality of guides 323. As an example, the outer end 323a of the plurality of guides 323 may protrude further toward the outer frame 330 in the thickness direction X of the display assembly 300 than the inner end 323b of the plurality of guides 323.

The inner frame 320 may further include the inner wall 325 positioned at an inner side of the plurality of guides 323. The inner wall 325 of the inner frame 320 may be surrounded by the plurality of guides 323. The inner wall 325 of the inner frame 320 may be spaced apart a predetermined distance from the plurality of guides 323 in the inward direction of the display assembly 300. The inner wall 325 of the inner frame 320 may protrude toward the outer frame 330 in the thickness direction X of the display assembly 300. The inner wall 325 of the inner frame 320 may have a closed loop shape, but the shape of the inner wall 325 of the inner frame 320 is not limited to the above example, and may be variously changed.

The outer frame 330 may include a first surface 331 facing the inner frame 320 and a second surface 332 forming the rear surface of the display assembly 300.

The outer frame 330 may have a structure similar to that of the inner frame 320.

The outer frame 330 may include a plurality of guides 333 formed at edges of the outer frame 330 to guide the coupling unit 400 together with the plurality of guides 323 of the inner frame 320. The coupling unit 400 may be guided by the plurality of guides 323 of the inner frame 320 and the plurality of guides 333 of the outer frame 330 in a state of being inserted between the plurality of guides 323 of the inner frame 320 and the plurality of guides 333 of the outer frame 330. The plurality of guides 333 of the outer frame 330 may be formed on the first surface 331 of the outer frame 330. Specifically, the plurality of guides 333 of the outer frame 330 may be formed at an upper edge, a lower edge, a left edge and a right edge of the first surface 331 of the outer frame 330. The plurality of guides 333 of the outer frame 330 may be formed along a circumference of the first surface 331 of the outer frame 330 to be spaced apart from each other.

Each of the plurality of guides 333 may include an outer end 333a (refer to FIG. 26A) directing an outer side of the outer frame 330 and an inner end 333b (refer to FIG. 26A) directing an inner side of the outer frame 330 and facing an inner wall 335 of the outer frame 330. The inner end 333b may be positioned on the opposite side of the outer end 333a. The plurality of guides 333 may have a shape corresponding to the shape of the coupling unit 400 moving along the plurality of guides 333. As an example, the outer end 333a of the plurality of guides 333 may protrude further toward the inner frame 320 in the thickness direction X of the display assembly 300 than the inner end 333b of the plurality of guides 333.

The outer frame 330 may further include the inner wall 335 positioned at an inner side of the plurality of guides 333. The inner wall 335 of the outer frame 330 may be surrounded by the plurality of guides 333.

The inner wall 335 of the outer frame 330 may be spaced apart a predetermined distance from the plurality of guides 333 in the inward direction of the display assembly 300. The inner wall 335 of the outer frame 330 may protrude toward the inner frame 320 in the thickness direction X of the display assembly 300. The inner wall 335 of the outer frame 330 may have a closed loop shape, but the shape of the inner wall 335 of the outer frame 330 is not limited to the above example, and may be variously changed.

The display assembly 300 may further include a plurality of rollers 350 provided such that the coupling unit 400 is smoothly guided along the plurality of guides 323 of the inner frame 320 and the plurality of guides 333 of the outer frame 330. The plurality of rollers 350 may be mounted on a roller mounting portion (not shown) formed by the coupling of the inner wall 325 of the inner frame 320 and the inner wall 335 of the outer frame 330. Each of the plurality of rollers 350 may be rotatably mounted on the roller mounting portion so that a portion thereof is exposed from the inner wall 325 of the inner frame 320 and the inner wall 335 of the outer frame 330 to be in contact with the coupling unit 400.

Preferably, the roller mounting portion may be formed at a corner of the inner wall 325 of the inner frame 320 and a corner of the inner wall 335 of the outer frame 330.

When the coupling unit 400 is coupled to one side of the display assembly 300, the plurality of rollers 350 may be involved. Preferably, two of the rollers 350 may be involved. As an example, when the coupling unit 400 is coupled to the left side of the display assembly 300, the coupling unit 400 may be smoothly guided by two of the rollers 350 partially exposed toward the left side of the display assembly 300.

The display assembly 300 may further include a control board 370 provided to control the display assembly 300. The control board 370 may be disposed in the internal space 340 of the display assembly 300. The control board 370 may be mounted on the first surface 331 of the outer frame 330 of the display assembly 300. The control board 370 may control the power supply and the transmission and reception of signals. When power is supplied to the control board 370 by a power source (not shown), the control board 370 may allow the at least one LED panel 310 to output an image signal. In addition, when power is supplied to the control board 370 by the power source, the control board 370 may allow power to be transmitted to the adjacent display assembly 300 via the coupling unit 400.

The display assembly 300 may further include a wireless communication module 380 disposed in the internal space 340 of the display assembly 300 together with the control board 370 so that the plurality of adjacent display assemblies 1 transmit and receive signals to each other. The wireless communication module 380 may include a short-range wireless communication module. Signals that may be transmitted and received through the wireless communication module 380 may include an image signal. The wireless communication module 380 may be mounted on the outer frame 330. Preferably, the display assembly 300 may include a plurality of the wireless communication modules 380, and the plurality of wireless communication modules 380 may be mounted on the outer frame 330 to surround the control board 370.

The power source may be connected to a power connector (not shown) of the display assembly 300 by a power cable 390.

The coupling unit may include an outer cover 410, a support plate 420 disposed inside the outer cover 410, a moving member 430 movably coupled to the support plate 420, an operation member 440 provided to be capable of pressing the moving member 430, and a locking member 450 involved in locking of the coupling unit 400 and the display assembly 300 according to the movement of the moving member 430.

The outer cover 410 may include a first outer cover 411 and a second outer cover 412 coupled to the first outer cover 411. The first outer cover 411 may face the outer frame 330 of the display assembly 300, and the second outer cover 412 may face the inner frame 320 of the display assembly 300. Specifically, the first outer cover 411 may face the first surface 331 of the outer frame 330 of the display assembly 300, and the second outer cover 412 may face the second surface 332 of the inner frame 320 of the display assembly 300. The first outer cover 411 may have a shape corresponding to the shape of the plurality of guides 333 formed on the outer frame 330, and the second outer cover 412 may have a shape corresponding to the shape of the plurality of guides 323 formed on the inner frame 320.

Openings 410a may be formed on the first outer cover 411 and the second outer cover 412, respectively, so that a protrusion 452 of the locking member 450 is inserted into the opening 410a so as to protrude to the outside of the coupling unit 400. The protrusion 452 of the locking member 450 that protrudes to the outside of the coupling unit 400 through the opening 410a may be fixedly coupled to a fixing groove 321a (refer to FIG. 26A) formed to be recessed on the second surface 322 of the inner frame 320 and a fixing groove 331a (refer to FIG. 26A) formed to be recessed on the first surface 331 of the outer frame 330.

The support plate 420 may be disposed between the first outer cover 411 and the second outer cover 412. Specifically, the support plate 420 may be disposed between the first outer cover 411 and the second outer cover 412 so that a portion of the support plate 420 is exposed to the outside of the coupling unit 400. The support plate 420 may be coupled to the first outer cover 411 and the second outer cover 412. Specifically, any one of the first outer cover 411 and the second outer cover 412 may be provided with fastening bosses 415, the other of the first outer cover 411 and the second outer cover 412 may be provided with fastening grooves (not shown) for fastening the fastening bosses 415, and the support plate 420 may be provided with boss through holes 421 through and to which the fastening bosses 415 passes and are coupled. The first outer cover 411, the support plate 420 and the second outer cover 412 may be coupled to each other by the fastening bosses 415 passing through the boss through holes 421 and being coupled to the fastening grooves.

The support plate 420 may be provided with a moving member seating portion 422 to which the moving member 430 is movably coupled. The moving member seating portion 422 may be formed to be recessed on one surface of the support plate 420 facing the first outer cover 411.

The moving member 430 may be coupled to the moving member seating portion 422 of the support plate 420 movably along a longitudinal direction L of the coupling unit 400. The moving member 430 may include a first surface 431 directing the first outer cover 411 and a second surface 432 directing the second outer cover 412. The first surface 431 and the second surface 432 of the moving member 430 may each be provided with a recessed portion 435.

The operation member 440 may be coupled to an upper portion of the support plate 420 so as to be capable of pressing the moving member 430. The moving member 430 may move in conjunction with the operation member 440. As an example, when the operation member 440 is pressed downward, the moving member 430 may move downward by the operation member 440.

The locking member 450 may be rotatably accommodated in locking member accommodating portions 413 and 414. The locking member accommodating portions 413 and 414 may include the first locking member accommodating portion 413 defined by the first outer cover 411 and one surface of the support plate 420 facing the first outer cover 411, and the second locking member accommodating portion 414 defined by the second outer cover 412 and the other of the support plate 420 facing the second outer cover 412.

The locking member 450 may include a body 451, the protrusion 452 formed to protrude from the body 451, and a rotating shaft 453 extending in the longitudinal direction L of the coupling unit 400 and coupled to the body 451. When the locking member 450 is located at the recessed portion 435 of the moving member 430, the locking between the coupling unit 400 and the display assembly 300 may be released. When the locking member 450 is located at a position other than the recessed portion 435 of the moving member 430, the coupling unit 400 and the display assembly 300 may be locked to each other.

Preferably, the coupling unit 400 may include a plurality of the locking members 450. Specifically, the coupling unit 400 may include a pair of first locking members 450a provided to interact with the first surface 431 of the moving member 430 and a pair of second locking members 450b provided to interact with the second surface 432 of the moving member 430. The pair of first locking members 450a may be positioned at an upper portion and a lower portion of the coupling unit 400, respectively. The pair of second locking members 450b may be positioned at an upper portion and a lower portion of the coupling unit 400, respectively.

The coupling unit 400 may further include a second power terminal 460 provided to contact a first power terminal 360 provided on the display assembly 300. The second power terminal 460 may be coupled to at least one of one surface of the support plate 420 facing the first outer cover 411 and the other surface of the support plate 420 facing the second outer cover 412. Specifically, the second power terminal 460 may be coupled to the support plate 420 such that a portion of the second power terminal 460 is exposed to the outside of the coupling unit 400.

The coupling unit 400 may have a symmetrical structure with respect to a reference line extending along the longitudinal direction L of the coupling unit 400. In another aspect, the coupling unit 400 may include a first portion that is involved in the coupling or locking with any one of a plurality of the adjacent display assemblies 300 and a second portion that is involved in the coupling or locking with the other one of the plurality of adjacent display assemblies 300.

The first and second portions may be symmetrical relative to each other with reference to the reference line extending along the longitudinal direction L of the coupling unit 400. Specifically, a portion of the first outer cover 411, a portion of the second outer cover 412, a portion of the moving member 430, a portion of the operation member 440 and a portion of the locking member 450 correspond to the first portion of the coupling unit 400, respectively, and the remaining portion of the first outer cover 411, the remaining portion of the second outer cover 412, the remaining portion of the moving member 430, the remaining portion of the operation member 440 and the remaining portion of the locking member 450 may correspond to the second portion of the coupling unit 400. The portion of the moving member 430, the portion of the operation member 440 and the portion of the locking member 450, which are included in the first portion of the coupling unit 400, and the remaining portion of the moving member 430, the remaining portion of the operation member 440 and the remaining portion of the locking member 450, which are included in the second portion of the coupling unit 400, may move independently of each other.

Figure 24A:
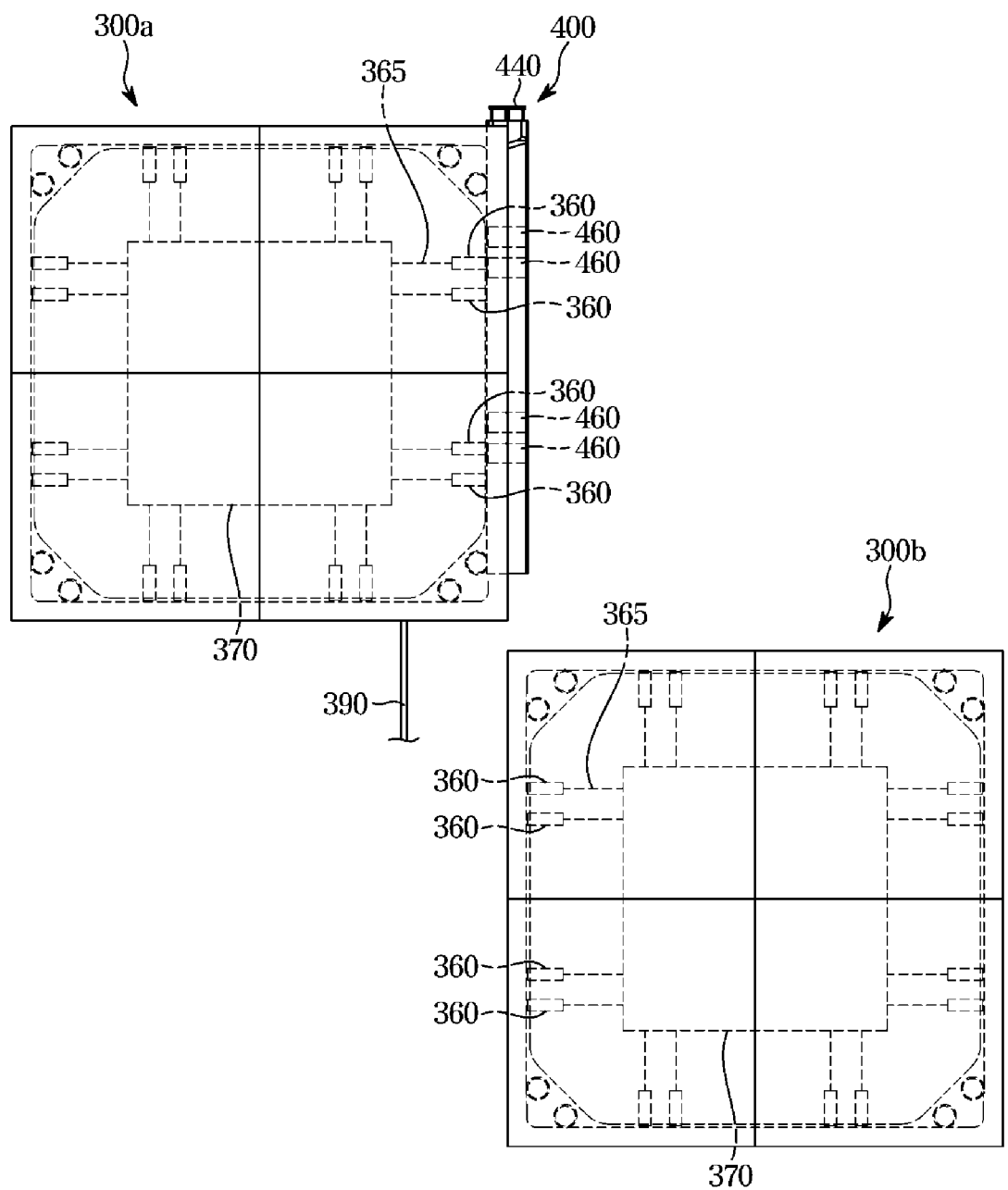
FIGS. 24A to 24C illustrate a process in which a first display assembly and a second display assembly are coupled to each other in a display assembly according to another embodiment of the present disclosure.
Figure 24B:
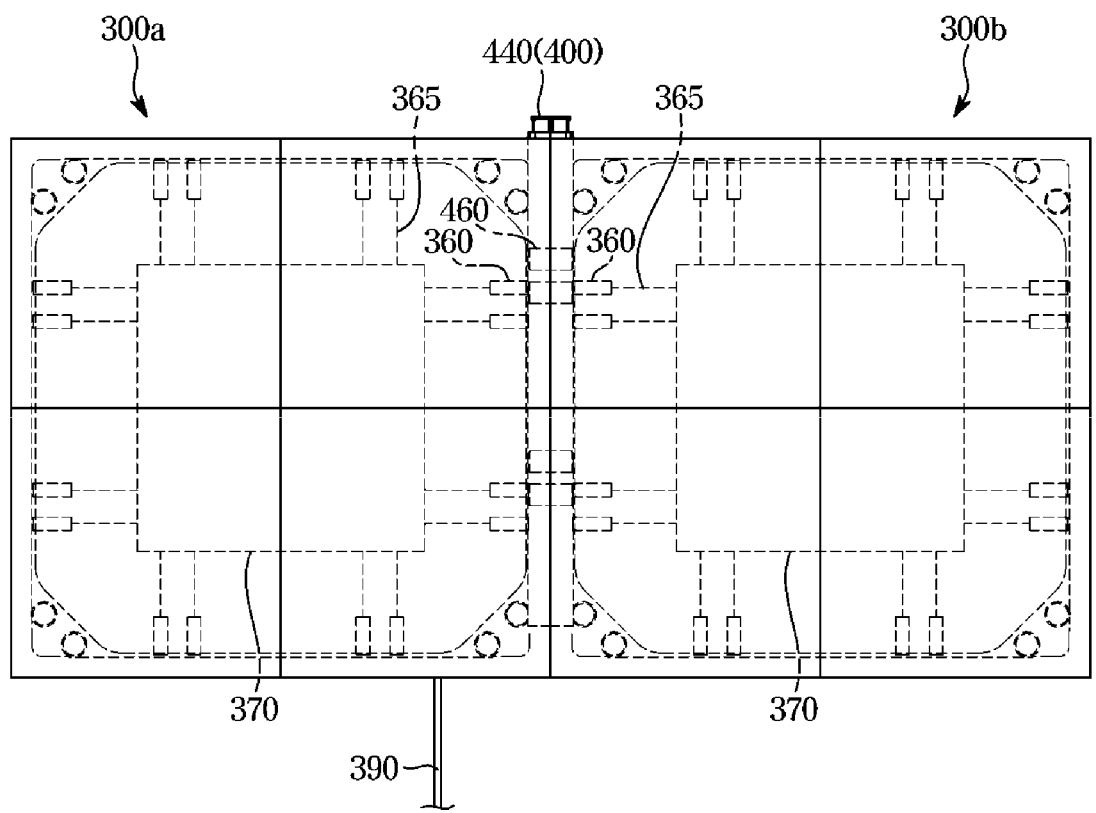
Figure 24C:
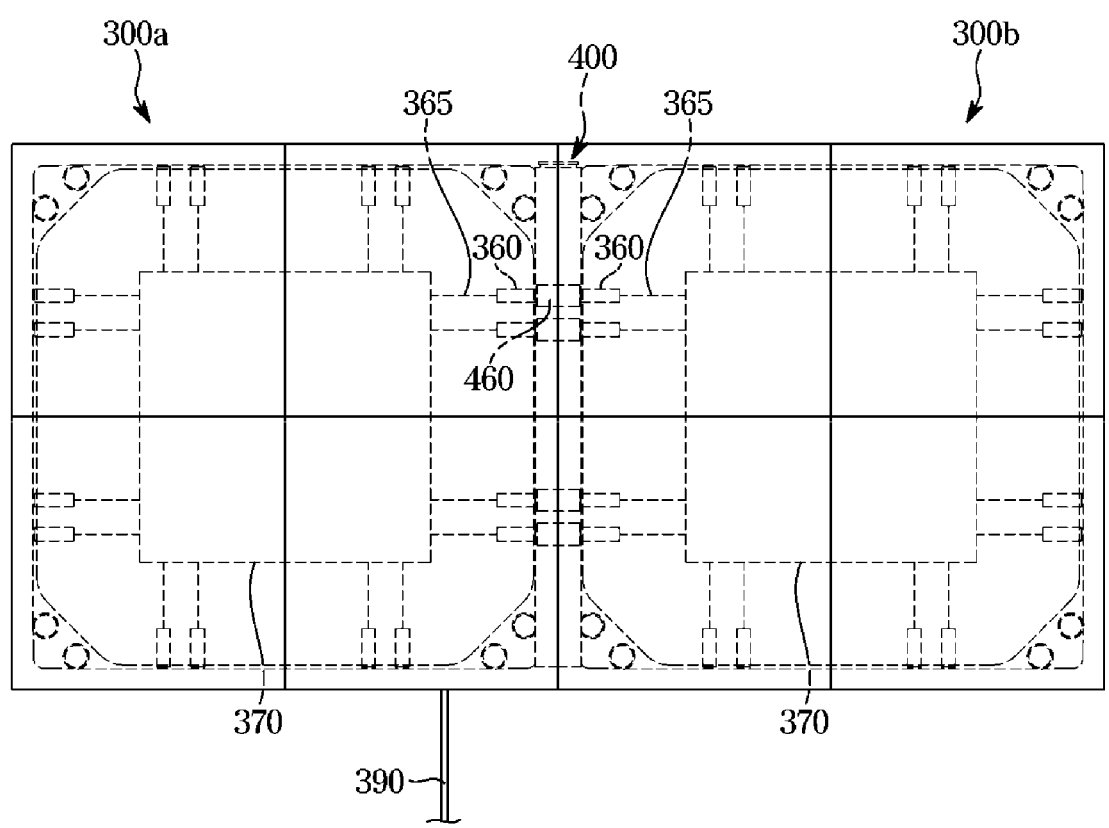
Figure 25A:
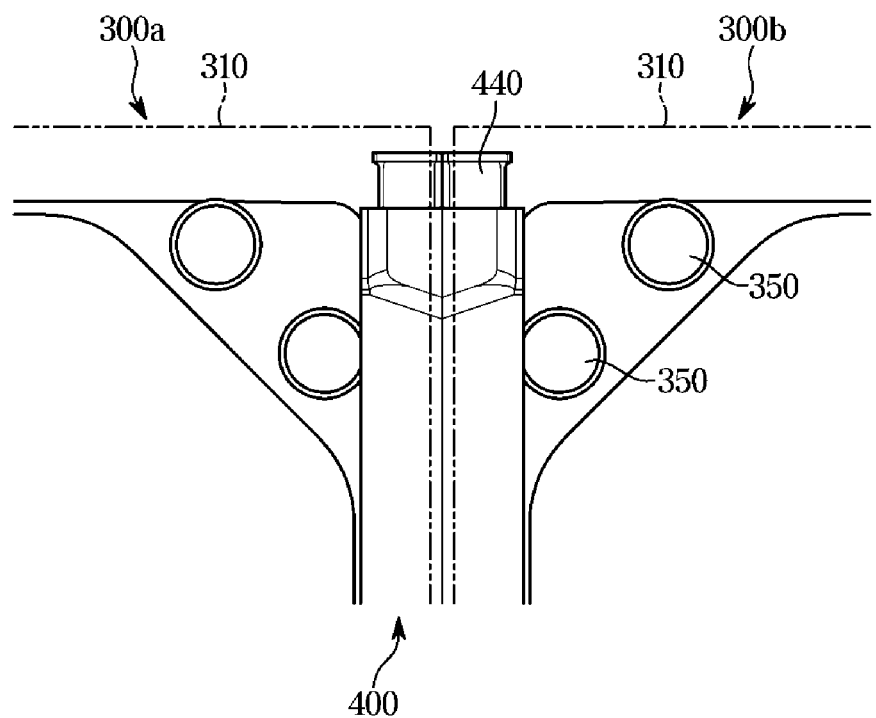
FIGS. 25A and 25B illustrate a first display assembly and a second display assembly before and after being locked by a coupler in a display assembly according to another embodiment of the present disclosure.
Figure 25B:
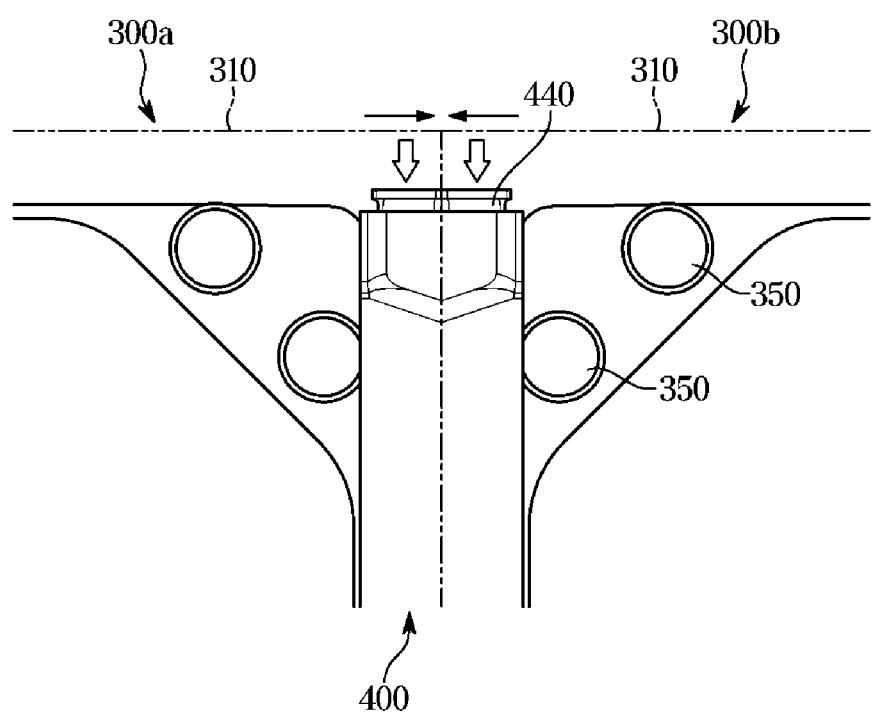
Figure 26A:
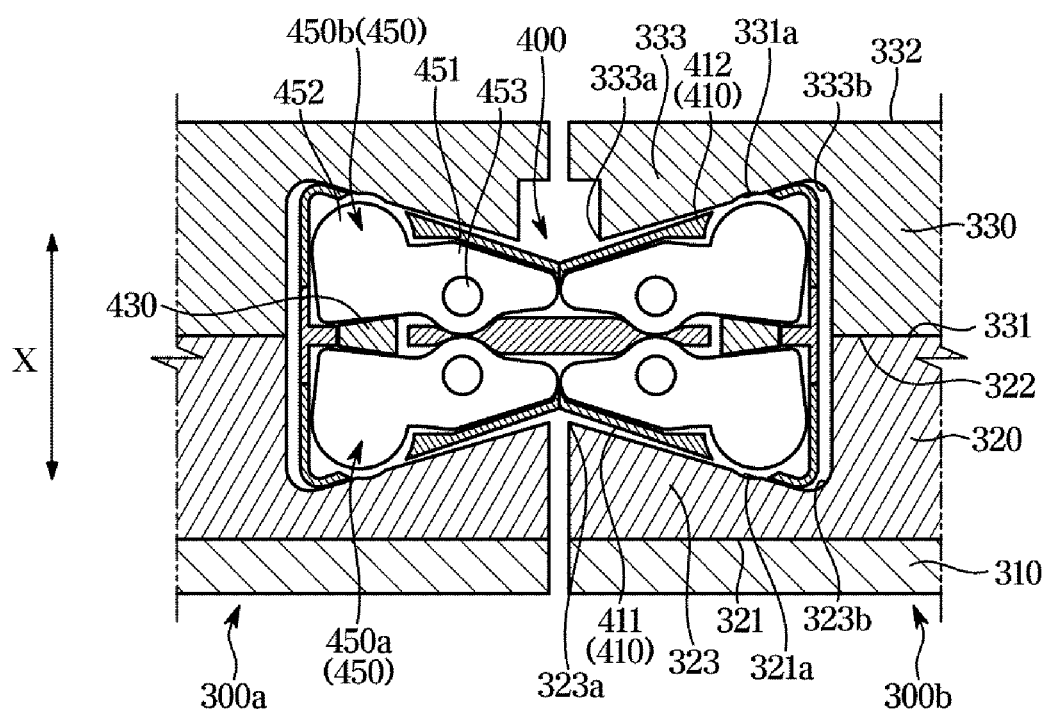
FIGS. 26A and 26B illustrate a first display assembly and a second display assembly before and after being locked by a coupler at a different angle from FIGS. 25A and 25B in a display assembly according to another embodiment of the present disclosure.
Figure 26B:
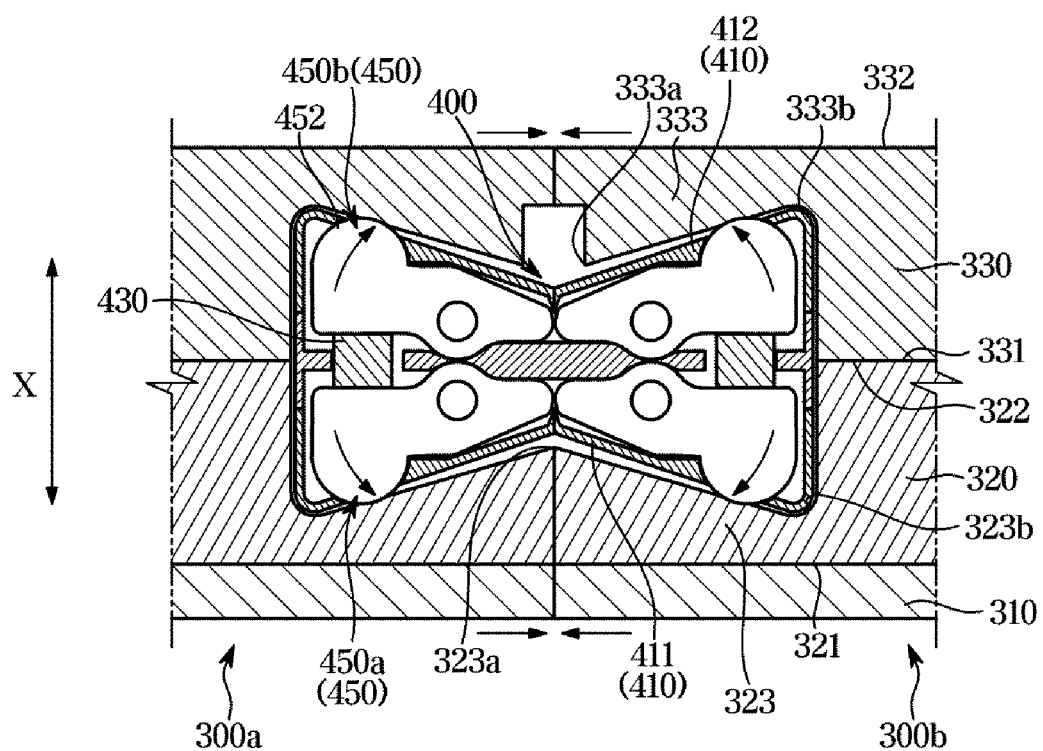

FIGS. 24A to 24C illustrate a process in which a first display assembly and a second display assembly are coupled to each other in a display assembly according to another embodiment of the present disclosure, FIGS. 25A and 25B illustrate a first display assembly and a second display assembly before and after being locked by a coupling unit in a display assembly according to another embodiment of the present disclosure, and FIGS. 26A and 26B illustrate a first display assembly and a second display assembly before and after being locked by a coupling unit at a different angle from FIGS. 25A and 25B in a display assembly according to another embodiment of the present disclosure.

As illustrated in FIGS. 24A to 26B, the display assembly 300 may include a first display assembly 300a and a second display assembly 300b adjacent to the first display assembly 300a.

The first display assembly 300a and the second display assembly 300b may be coupled to each other by the coupling unit 400. Specifically, the first display assembly 300a and the second display assembly 300b may be coupled to each other and at the same time electrically connected by the coupling unit 400. The coupling unit 400 may function to perform physical coupling and electrical connection of the first display assembly 300a and the second display assembly 300b.

As an example, the case where the first display assembly 300a and the second display assembly 300b that are adjacent to each other in the left-right direction are coupled to each other by the coupling unit 400 will be described below.

The first portion of the coupling unit 400 may be coupled to the right of the first display assembly 300a. Specifically, the first portion of the coupling unit 400 may be coupled to the right of the first display assembly 300a by being smoothly guided by the rollers 350 in a state of being inserted between the guides 323 formed at the right edge of the inner frame 320 of the first display assembly 300a and the guides 333 formed at the right edge of the outer frame 330 of the first display assembly 300a. When the first portion of the coupling unit 400 is coupled to the right of the first display assembly 300a, the left of the second display assembly 300b may be coupled to the second portion of the coupling unit 400. When the first display assembly 300a and the second display assembly 300b are coupled via the coupling unit 400, the first display assembly 300a and the second display assembly 300b may be locked to each other by pressing the operation member 440 of the coupling unit 400. Specifically, when the operation member 440 of the coupling unit 400 is pressed, the locking member 450 deviates from the recessed portion 435 of the moving member 430 as the moving member 430 moves downward. When the locking member 450 deviates from the recessed portion 435 of the moving member 430, as the locking member 450 rotates about the rotating shaft 453, the protrusion 452 of the locking member 450 may be fixedly coupled to the fixing grooves 321a and 331a formed on the first display assembly 300a and the second display assembly 300b by protruding to the outside of the coupling unit 400 through the opening 410a of the first outer cover 411 and the opening 410a of the second outer cover 412. Thus, the first display assembly 300a and the second display assembly 300b may be locked to each other via the coupling unit 400. When the first display assembly 300a and the second display assembly 300b are completely locked via the coupling unit 400, the first display assembly 300a and the second display assembly 300b may be in close contact with each other without a gap.

The power source may be connected to any one of the first display assembly 300a and the second display assembly 300b. As an example, the case where the power source is connected to the first display assembly 300a by the power cable 390 will be described below.

The power source may be connected to the first display assembly 300a by the power cable 390. When the power source is connected to the first display assembly 300a, the control board 370 of the first display assembly 300a may receive power from the power source. The first power terminal 360 may receive power from the control board 370 because the first power terminal 360 of the first display assembly 300a is electrically connected to the control board 370 by the first power cable 360. The power supplied to the second display assembly 300b may be transmitted to the second display assembly 300b by the contact between the first power terminal 360 provided on the first display assembly 300a, the second power terminal 460 provided on the coupling unit 400 and the first power terminal 360 provided on the second display assembly 300b.

The first display assembly 300a may also receive a signal such as an image signal from the outside. The control board 370 of the first display assembly 300a may allow the at least one LED panel 310 of the first display assembly 300a to output an image signal. Also, the signal inputted to the first display assembly 300a may be transmitted to the second display assembly 300b through the transmission and reception between the wireless communication modules 380 of the first display assembly 300a and the second display assembly 300b. The at least one LED panel 310 of the second display assembly 300b may output the image signal received from the first display assembly 300a.

Figure 27:
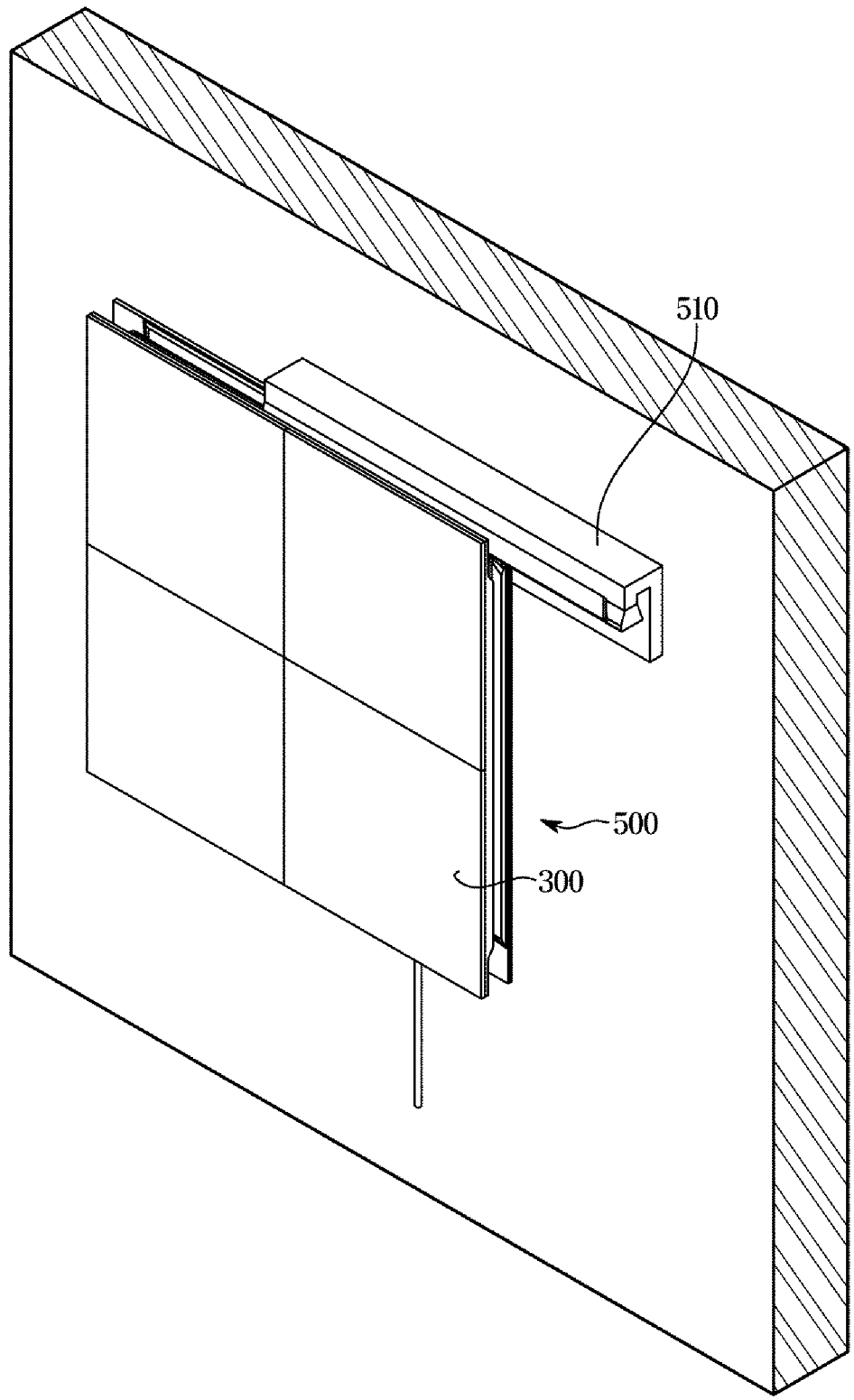
FIGS. 27 to 29 illustrate examples of various uses to which a display assembly according to another embodiment of the present disclosure is applied.
Figure 28:
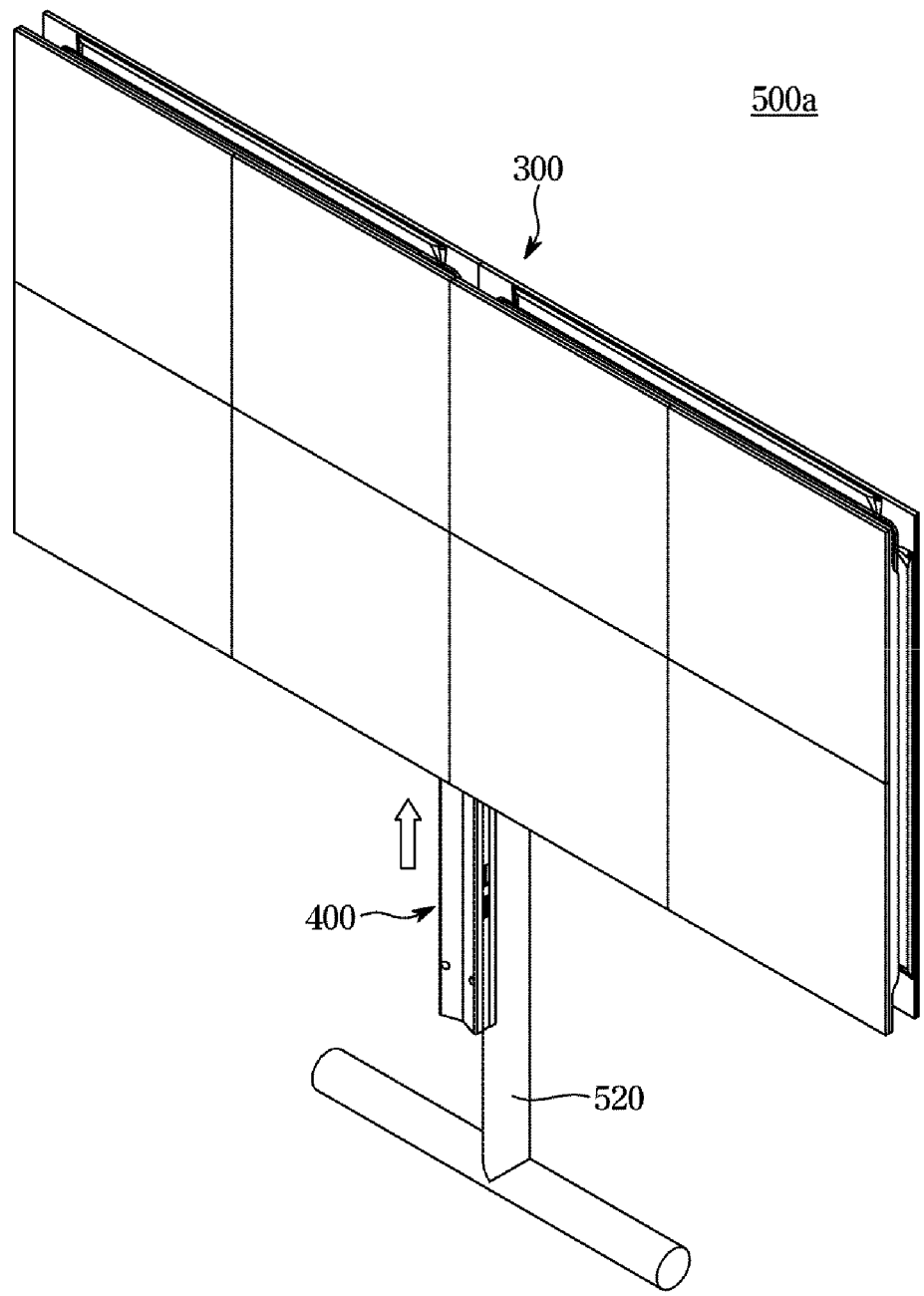
Figure 29:
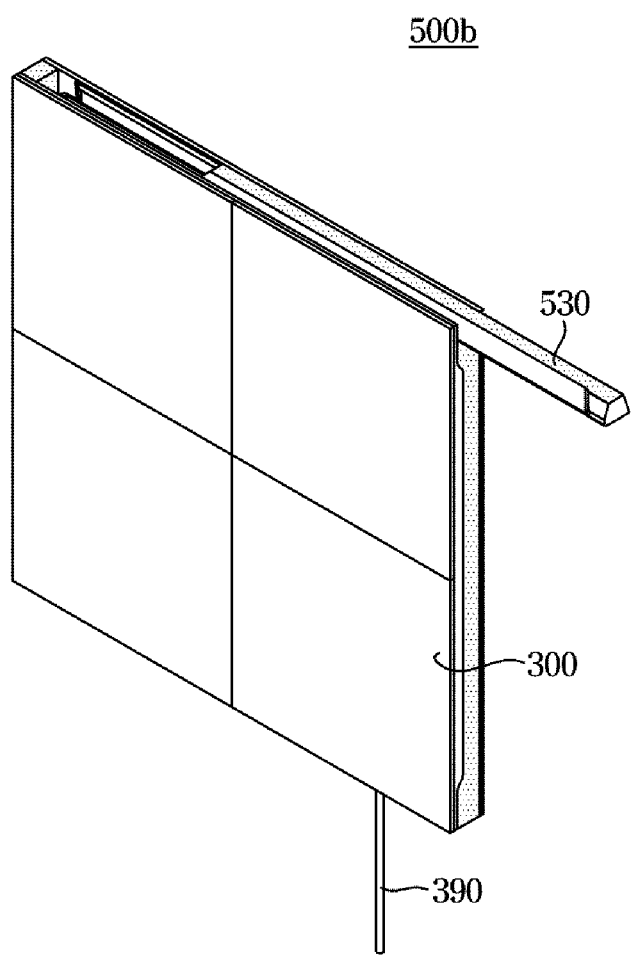

FIGS. 27 to 29 illustrate examples of various uses to which a display assembly according to another embodiment of the present disclosure is applied.

As illustrated in FIGS. 27 to 29, the display assemblies 300 may be implemented as various types of display apparatuses 500, 500a, and 500b.

As illustrated in FIG. 27, the display apparatus 500 may include one of the display assemblies 300. The display apparatus 500 may be installed on a mounting surface such as a wall to display various images. A bracket 510 having a structure similar to the coupling unit 400 may be used in the process of installing the display apparatus 500 including the display assembly 300 on a mounting surface such as a wall. The display assembly 300 may be implemented as the display apparatus 500 of a wall-mounted type by being coupled to the bracket 510 mounted on a wall in the same manner as that coupled to the coupling unit 400.

As illustrated in FIG. 28, the display apparatus 500a may include a plurality of the display assemblies 300, the coupling unit 400, and an accessory coupled to the coupling unit 400. The accessory may include a stand 520. The stand 520 coupled to the coupling unit 400 may support the plurality of display assemblies 300 on a mounting surface while coupling the plurality of display assemblies 300.

As illustrated in FIG. 29, the display apparatus 500b may include the at least one of the display assemblies 300, and an accessory coupled to the at least one display assembly 300 to form a side surface appearance of the display apparatus 500b. The accessory may include a bezel 530. The bezel 530 may have a structure similar to the coupling unit 400. The bezel 530 may form the side surface appearance of the display apparatus 500b by being coupled to the at least one display assembly 300 in the same manner that the coupling unit 400 is coupled to the at least one display assembly 300.

As is apparent from the above, the disclosed display apparatus has an improved structure capable of easily coupling a plurality of display assemblies. The disclosed display apparatus also has an improved structure capable of transmitting power or signals to a plurality of display assemblies using a minimum number of power cables.

In addition, the disclosed display apparatus has an improved structure capable of easily coupling at least one display assembly and an accessory.

As is apparent from the above, a plurality of display assemblies adjacent to each other can be easily coupled by rotating an operation unit of any one of the plurality of display assemblies. Also, the plurality of display assemblies adjacent to each other can be easily coupled by pressing an operation member of a coupling unit.

The power supplied to any one of the plurality of display assemblies can be transmitted to the plurality of adjacent display assemblies through the contact of a first power terminal and a second power terminal without connecting a power cable to each of the plurality of display assemblies in order to supply power. Also, signals can be transmitted and received between the plurality of adjacent display assemblies using a wireless communication module without a separate communication cable.

Further, at least one display assembly and an accessory can be easily coupled through the coupling of a coupling unit of the at least one display assembly and a slit of the accessory.

The embodiments disclosed with reference to the accompanying drawings have been described above. However, it will be understood by those skilled in the art that various changes in form and details may be made therein without departing from the spirit and scope of the present disclosure as defined by the appended claims.

What is claimed is:
1. A display apparatus comprising:
a first display assembly and a second display assembly adjacent to the first display assembly, each of the first display assembly and the second display assembly including:
a display module having a screen;
a display module support configured to support the display module, the display module support including a slit and a support power terminal installed adjacent the slit; and a coupler including a fastener configured to rotate so as to protrude to the outside of the slit and having a coupler power terminal, wherein the coupler power terminal of the first display assembly contacts the support power terminal of the second display assembly such that the first display assembly and the second display assembly are electrically connected to each other when the fastener of the first display assembly is coupled to the slit of the second display assembly.

2. The display apparatus according to claim 1, wherein the display module is configured to be detachably coupled to the display module support.

3. The display apparatus according to claim 1, wherein each of the first display assembly and the second display assembly further includes an actuator rotatably coupled to the coupler and configured to operate the coupler.

4. The display apparatus according to claim 3, wherein the display module support includes a front frame facing the display module, and the actuator is configured to be exposed to the outside of the front frame.

5. The display apparatus according to claim 3, wherein the coupler includes:

a rotation member coupled to the actuator and configured to rotate integrally with the actuator; and a link member to connect the rotation member and the fastener.

6. The display apparatus according to claim 1, wherein the display module support includes:

a front frame facing the display module;

a rear frame facing the front frame and on which the coupler is mounted; and a side frame connecting the front frame to the rear frame, and formed such that the slit corresponds to the coupler of the display module support.

7. The display apparatus according to claim 6, wherein the slit is formed on the side frame.

8. The display apparatus according to claim 7, wherein the support power terminal is mounted on an inner wall of the side frame to contact the coupler power terminal so that power is transmitted between the first display assembly and the second display assembly.

9. The display apparatus according to claim 6, wherein the display module support further includes:

a rear cover coupled to the rear frame to form a rear surface appearance of the display module support and having a cut portion; and a cap detachably disposed in the cut portion to cover a mounting groove formed to be recessed on one surface of the front frame.

10. The display apparatus according to claim 1, wherein each of the first display assembly and the second display assembly further includes:

an image signal control board disposed in one of the display module and the display module support; and a wireless communication module disposed in the one of the display module and the display module support together with the image signal control board to transmit and receive signals between the first display assembly and the second display assembly.

11. The display apparatus according to claim 1, wherein each of the first display assembly and the second display assembly further includes a power control board disposed in the display module support, the display module support further includes a first connector coupled to the power control board, and the display module includes:

at least one LED panel;

a support frame to support the at least one LED panel; and a second connector coupled to the first connector and configured to transmit and receive signals or power between the display module and the display module support.

* * * * *